United States Patent
Mogamiya et al.

[19]

[11] Patent Number: 6,081,675
[45] Date of Patent: Jun. 27, 2000

[54] MARKING DEVICE OF ELECTRO-DEVELOPING TYPE VIDEO CAMERA

[75] Inventors: Makoto Mogamiya; Yasuhiro Yamamoto, both of Tokyo, Japan

[73] Assignee: Asahi Kogaku Kogyo Kabushiki Kaisha, Tokyo, Japan

[21] Appl. No.: 08/911,040

[22] Filed: Aug. 14, 1997

Related U.S. Application Data

[63] Continuation-in-part of application No. 08/781,595, Jan. 9, 1997, abandoned, and application No. 08/820,037, Mar. 19, 1997.

[30] Foreign Application Priority Data

| Feb. 16, 1996 | [JP] | Japan | 8-053915 |
| Mar. 22, 1996 | [JP] | Japan | 8-093108 |
| Mar. 27, 1996 | [JP] | Japan | 8-097593 |

[51] Int. Cl.[7] .................................................. G03B 19/00
[52] U.S. Cl. .......................................... 396/429; 396/30
[58] Field of Search .............................. 396/30, 429, 430, 396/315–319; 358/506, 515, 516, 518, 487

[56] References Cited

U.S. PATENT DOCUMENTS

| 4,945,423 | 7/1990 | Takanashi et al. | 358/300 |
| 5,251,021 | 10/1993 | Parulski et al. | 358/500 |
| 5,315,410 | 5/1994 | Takanshi et al. | 358/471 |
| 5,424,156 | 6/1995 | Aoki et al. | . |
| 5,555,205 | 9/1996 | Okabe | 365/108 |
| 5,629,920 | 5/1997 | Sakano et al. | 369/120 |
| 5,646,927 | 7/1997 | Shimizu et al | 369/99 |
| 5,655,166 | 8/1997 | Miyamoto et al. | 396/317 |
| 5,737,652 | 4/1998 | Hibino et al. | 396/319 |

FOREIGN PATENT DOCUMENTS

| 5-2280 | 1/1993 | Japan . |
| 8101366 | 4/1996 | Japan . |

*Primary Examiner*—Safet Metjahic
*Assistant Examiner*—John Chizmar
*Attorney, Agent, or Firm*—Greenblum & Bernstein, P.L.C.

[57] ABSTRACT

A marking device of an electro-developing type video camera having a color separation optical system to color separate an object to be photographed into a plurality of color components, and an electro-developing recording medium having a plurality of optical image recording areas that electrically develop optical images corresponding to the color components. The marking device has a marking mechanism that forms a positioning mark indicating a relative position of each of the optical images developed in the plurality of optical image recording areas. The positioning mark is formed outside the optical image recording areas.

44 Claims, 20 Drawing Sheets

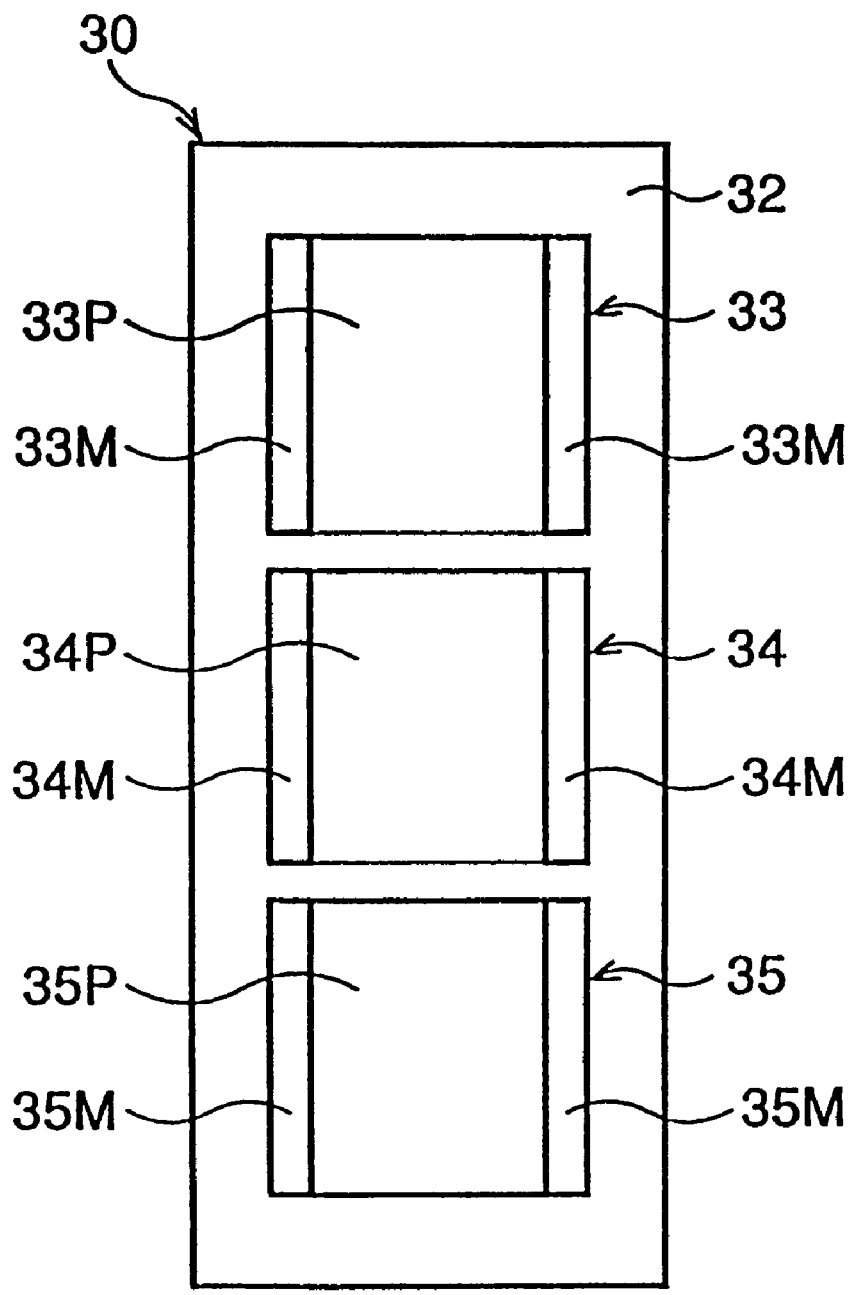

R/G SIGNAL

B/G SIGNAL

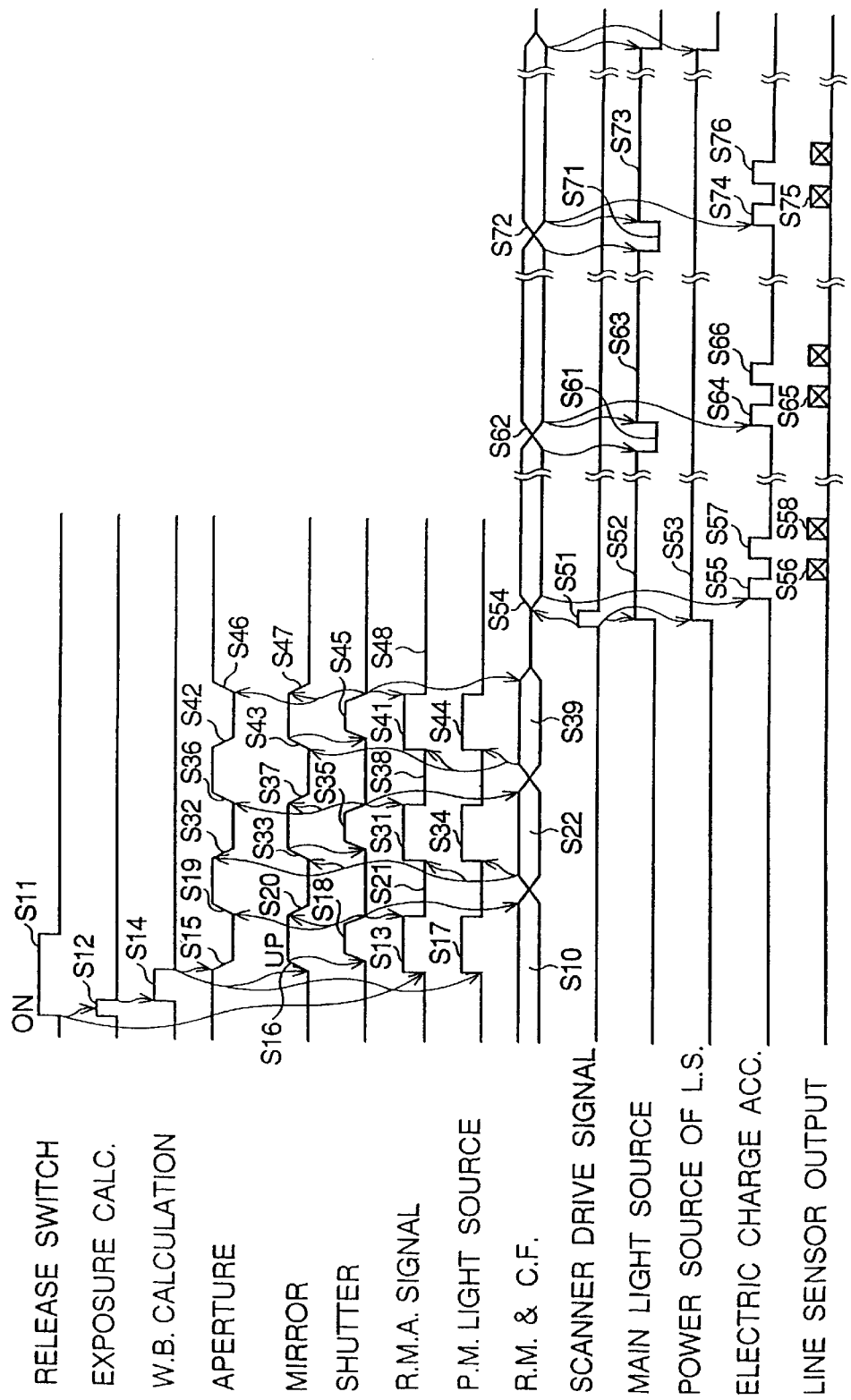

6,081,675

MARKING DEVICE OF ELECTRO-DEVELOPING TYPE VIDEO CAMERA

CROSS REFERENCE TO RELATED APPLICATIONS

The present application is a continuation-in-part application of pending U.S. patent application Ser. No. 08/781,595 to Makoto MOGAMIYA, entitled "Marking Device Of Electro-Developing Type Video Camera", filed on Jan. 9, 1997, now abandonded and also pending U.S. patent application Ser. No. 08/820,037 to Yasuhiro YAMAMOTO, entitled "State Of Recording Sensing Device", filed on Mar. 19, 1997. The disclosure of U.S. patent application Ser. Nos. 08/781,595 and 08/820,037 are each expressly incorporated by reference, in their entireties, herein. The present continuation-in-part application does not include any substantive disclosure not present in pending U.S. patent application Ser. Nos. 08/781,595 and 08/820,037, and is thus a continuation-in-part application only because no single one of the parent applications alone include all of the presently disclosed material.

BACKGROUND OF THE INVENTION

1. Field of the Invention

The present invention relates to an electro-developing type video camera using an electro-developing recording medium. More particularly, the present invention is directed to electronically and directly recording and developing, as a visible image, an optical image obtained through a photographing optical system, and for controlling the recording operation of the recording medium.

2. Description of the Related Art

Conventionally, there is known a recording medium which electronically develops an optical image formed thereon through a photographing optical system.

Such a recording medium is a combination of an electrostatic information recording medium and an electric charge keeping medium. In the electro-developing recording medium, the electrostatic information recording medium has a photoconducting layer and an inorganic oxide material layer. The electric charge keeping medium has a liquid crystal display. When the electrostatic information recording medium is exposed while an electric voltage is applied to both the electrostatic information recording medium and the electric charge keeping medium, an electric charge in accordance with the amount of incident light is generated in the electrostatic information recording medium.

There is an electro-developing type video camera, which has a color separation unit comprising red (R), green (G), and blue (B) color filter elements, and a recording medium unit comprising recording mediums. While photographing an object, the color separation unit and the recording medium unit are moved in synchronization with each other, so that light passing through a photographing optical system passes through R, G and B color filter elements. The color components (R, G, B) are separated, and optical images corresponding to each color component are recorded on the recording mediums, respectively. In this type of electro-developing type video camera, optical image data corresponding to each color component is read by, for example, scanning the optical images with a line sensor. The color image of the object is made by synthesizing the optical image data.

The optical image data can be synthesized by positioning each optical image by sight. However, the efficiency of synthesization by sight is low, because high skill is necessary to position the optical image data. Accordingly, it is very difficult to get an extremely precise object image.

As disclosed in Japanese Unexamined Patent Publication No. HEI 5-2280 and U.S. Pat. No. 5,424,156, there is known a photographic material which is directly and electronically developed so that a developed visible image can be immediately obtained. In this specification, such a recording medium is referred to as an electro-developing recording medium, and an electronic still camera using the electro-developing recording medium is referred to as an electro-developing type camera.

An image recorded on the electro-developing recording medium is hard to see, and therefore, it is difficult to recognize at a glance whether the recording medium has been recorded.

On the other hand, the electro-developing recording medium may have a plurality of recording areas, where the three primary color images corresponding to the object image can be recorded. These color images are superimposed on one another to form an image having a natural color.

SUMMARY OF THE INVENTION

Accordingly, an object of the present invention is to provide an electro-developing type camera for photographing a color image, in which optical image data is easily synthesized.

According to another object of the present invention, a device is disclosed which can sense recordings of an electro-developing recording medium, without providing an exclusive device for marking the recording medium (recording medium unit) to indicate a previous recording.

In accordance with an aspect of the instant invention, there is provided a marking device of an electro-developing type video camera having a color separation optical system to color separate an object to be photographed into a plurality of color components, and an electro-developing recording medium having a plurality of optical image recording areas that electrically develop optical images corresponding to the color components. The marking device comprises a marking mechanism that forms a positioning mark indicating a relative position of each of the optical images developed in the plurality of optical image recording areas, with the positioning mark being formed outside the optical image recording areas.

According to an advantage of the present invention, a feeder is provided that supplies the color separation optical system and the electro-developing recording medium within a plane perpendicular to an optical axis of a photographing optical system of the electro-developing camera.

Another advantage of the present invention resides with the feeder suppling the color separation optical system and the electro-developing recording medium in synchronization with each other.

According to a feature of the present invention, a light source emits a marking light by which the positioning mark is formed.

According to another feature, the marking mechanism comprises a mirror that reflects the marking light, such that the marking light is directed to the electro-developing recording medium.

A still further feature of the present invention resides in the color separation optical system comprising a color filter.

An advantage of the present invention resides in the marking mechanism being mounted to the color separation optical system.

Another advantage of the instant invention pertains to the inclusion of a shutter unit that is mounted to the marking mechanism.

Another feature of the present invention pertains to forming the positioning mark outside of each optical image recording area of the plurality of optical image recording areas of the electro-developing recording medium, with each positioning mark having a substantially similar shape and form.

According to another advantage of the present invention, a light unit is provided. The light unit has a light source, such as, for example, a light emitting diode, that emits light for reproducing an object image from the optical images corresponding to the color components. The marking mechanism forms the positioning mark outside of the plurality of optical image recording areas on the electro-developing recording medium using the light. The lighting unit includes a first reflecting mirror that directs the light to an outside of the plurality of optical image recording areas of the electro-developing recording medium when a photographing operation occurs, and a second reflecting mirror that directs the light to the plurality of optical image recording areas of the electro-developing recording medium when a reproducing operation occurs.

According to a feature of the present invention, the positioning mark is L-shaped. Each positioning mark is formed when each of the optical images are recorded to each associated optical image recording area of the plurality of optical image recording areas. The positioning mark has a first linear portion located at a portion extending from an upper end portion of each optical image recording area of the plurality of optical image recording areas, and a second linear portion perpendicular to the first linear portion. Alternatively, the positioning mark may comprise a linear portion parallel to a longitudinal axis of the line sensor, with an amount of light passing through the linear portion being sensed by, for example, a line sensor.

According to another advantage of the present invention, a determining unit, such as, for example, a line sensor, is provided that determines whether the electro-developing recording medium has been previously recorded on. This is accomplished by sensing the positioning mark. The determining unit senses the transmittance of the optical image recording area. In addition, the determining unit includes an averaging processor that finds an average value of pixel data corresponding to the positioning mark read by the line sensor.

A still further advantage resides in the recording unit comprising a light source that emits a light beam to illuminate an optical image recording area, of the plurality of optical image recording areas of the electro-developing recording medium, so that a transmittance of the optical image recording area is changed, to form the positioning mark.

According to another advantage of the instant invention, the marking device further comprises a sensing processor that senses color temperature information with regard to the optical images of said color components, and a color temperature superimposing unit that superimposes the color temperature information on the positioning mark when the positioning mark is formed. The color temperature information may correspond to a transmittance of the positioning mark. Additionally, a color temperature reading unit may be provided that reads the color temperature information from the positioning mark. An optical sensor may also be provided to read the optical images from the plurality of optical image recording areas, while a control processor controls an electric charge accumulating time of the optical sensor, in accordance with the color temperature information read by the color temperature reading unit. It is noted that the color temperature reading unit and the optical sensor may comprise a single sensor.

In a still further advantage, the marking mechanism includes a light source that emits a light beam to illuminate the electro-developing recording medium to change a transmittance of the electro-developing recording medium, to form the positioning mark.

According to another object of the present invention, a marking device of an electro-developing type video camera is disclosed. The camera has a plurality of color separation optical systems that color separate an object into a plurality of color components, and a plurality of electro-developing recording media, which respectively have an optical image recording area in which an optical image corresponding to one of said color components is electrically developed.

The marking device comprises a marking mechanism that forms a positioning mark outside of the optical image recording area, with the positioning mark indicating information of an angle to a predetermined point of the optical image and a distance from the predetermined point of the optical image. The positioning mark is used for combining the optical images corresponding to the color components. The marking device may further comprise a recording medium holder that aligns the electro-developing recording media. The alignment may be a vertical alignment.

The marking device may additionally comprise a color separation holder that vertically aligns the color separation optical systems. The color separation holder may be semicircular, so that the color separation optical systems are held and arranged circumferentially.

According to another object of the present invention, a marking device of an electro-developing camera having means for separating a plurality of color components from a luminance reflected by an object and means for electrically recording each of the plurality of color components is disclosed, in which the marking device comprises means for moving the separating means and the recording means within a plane perpendicular to an optical axis of a photographing optical system, means for emitting light, and means for forming a positioning mark outside of an optical image recording area of the recording means using the light emitted by the emitting means.

BRIEF DESCRIPTION OF THE DRAWINGS

The present invention will be better understood from the description of preferred embodiments of the invention set forth below, together with the accompanying drawings, in which:

FIG. 3 illustrates a front view of a recording medium unit used in the electro-developing type video camera of FIG. 1;

FIG. 26 illustrates a timing chart showing a recording operation and a reading operation;

DESCRIPTION OF PREFERRED EMBODIMENTS

Figure 1:
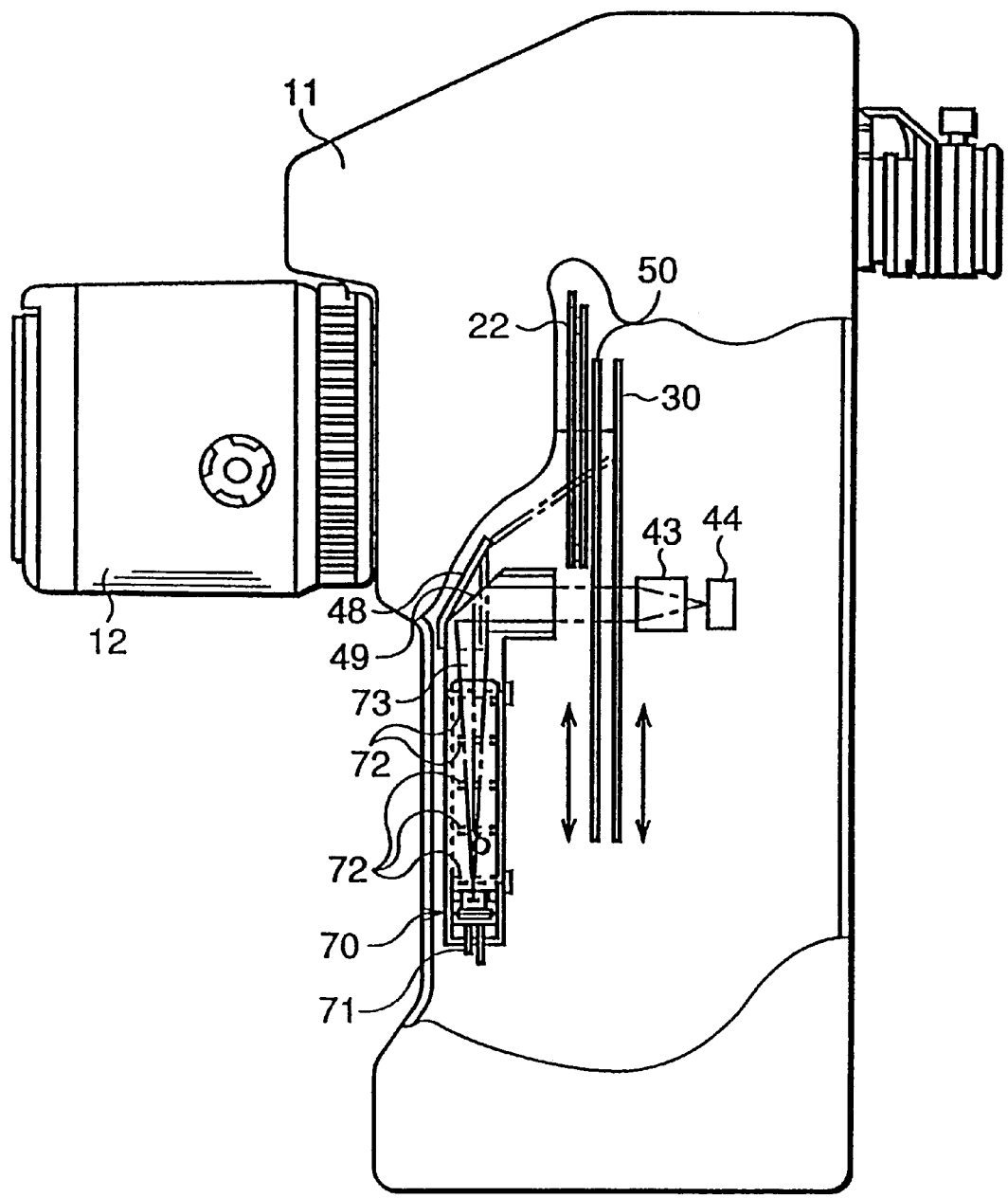
FIG. 1 illustrates a partially-cut-away sectional view of a first embodiment of an electro-developing type video camera, according to the present invention, while photographing.

The present invention will now be described with reference to embodiments shown in the drawings, in which:

FIG. 1 illustrates a partially-cut-away sectional view of a first embodiment of an electro-developing type video camera according to the present invention.

Light reflected by an object is directed into a camera body 11 through a photographing lens 12 (a photographing optical system), and passes through a shutter unit 22 and a color separation unit 50, to be directed to a recording medium unit 30.

A light unit 70 is mounted adjacent to the color separation unit 50. The light unit 70 comprises a light source 71, boards 72 which prevent diffusion, a collimator lens 73, a first mirror 48 and a second mirror 49. Both the first mirror 48 and the second mirror 49 are total reflecting mirrors. The second mirror 49 is provided with an aperture, such as, for example, a hole or a slit, by which light emitted from the light source 71 can be directed to the first mirror 48. The light emitted from the light source 71 becomes a parallel beam by passing through the collimator lens 73.

The parallel beam partially passes through the aperture (e.g., hole) of the second mirror 49 and is reflected at the first mirror 48 and directed to the recording medium unit 30. Further, the parallel beam is partially reflected at the second mirror 49 and passes through an imaging optical system 43, and is directed to a line sensor 44. The color separation unit 50 and the recording medium unit 30 are movable in the direction of the arrows shown in FIG. 1, either in synchronization with each other or independently.

When the electro-developing type video camera is turned ON, the light source 71 emits light. The light source 71 continues to emit light until the electro-developing type video camera is turned OFF.

The first mirror 48 is mounted on the camera body 11 at a predetermined angle, such that the light emitted from the light source 71 passes through the color separation unit 50 and is directed to the recording medium unit 30. The imaging optical system 43 is positioned between the second mirror 49 and the line sensor 44. The second mirror 49 is mounted in the camera body 11 at a second predetermined angle, such that the second mirror 49 reflects the light emitted from the light source 71 to the imaging optical system 43.

Figure 2:
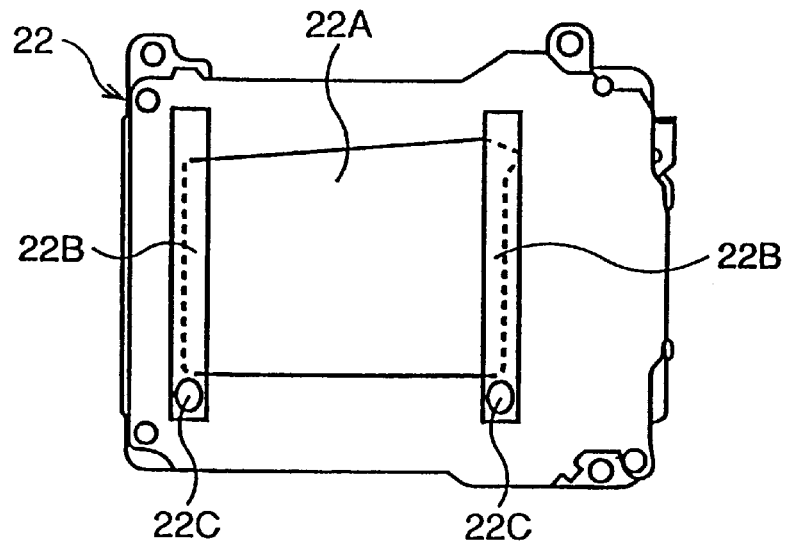
FIG. 2 illustrates a front view of a shutter unit used in the electro-developing type video camera of FIG. 1.

FIG. 2 is a front view illustrating a shutter unit 22 from the color separation unit 50. The shutter unit 22 is provided with a light passing area 22A which is an open portion. After the light reflected by the object passes through the photographing lens 22, the light passes through the light passing area 22A. Shading masks 22B are mounted at right and left sides of the light passing area 22A in such a manner that the shading masks 22B overlap portions which extend along the right and left sides of the light passing area 22A and overlap portions adjacent to the right and left sides of the light passing area 22A. The shading mask 22B is provided with an aperture, such as, for example, a hole, in the lower portion which does not overlap the light passing area 22A. The shutter unit 22A is provided with an aperture (e.g., hole) corresponding to the hole of the shading mask 22B. The holes of the shutter unit 22A and the shading mask 22B forms an aperture (e.g., hole) 22C. The light emitted from the light source 71 passes through the hole 22C, such that the light is directed to the color separation unit 50.

FIG. 3 is a front view showing a recording medium unit 30 from the color separation unit 50 side. A holder 32 is provided with three open portions aligned along the moving direction of the recording medium unit 30. Respective electro-developing recording mediums (media) 33, 34 and 35 are attached to the open portions. The electro-developing recording mediums 33, 34 and 35 comprise centermost photographing areas 33P, 34P and 35P, and position marking areas 33M, 34M and 35M at each of the left and right side of the photographing area.

Figure 4:
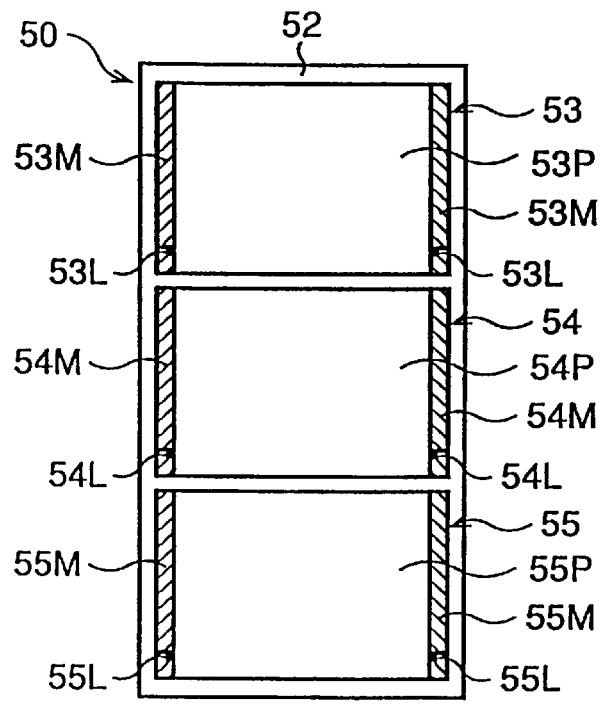
FIG. 4 illustrates a front view of a color separation unit used in the electro-developing type video camera of FIG. 1.
Figure 5:
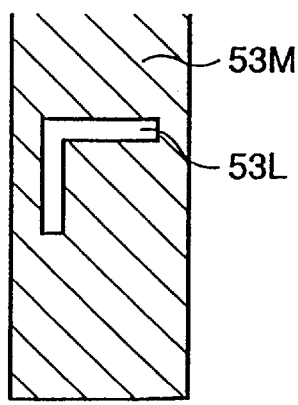
FIG. 5 illustrates a partially enlarged view of a shading portion of the color separation unit shown in FIG. 4.

FIG. 4 is a front view of a color separation unit 50 used in the first embodiment of the electro-developing type video camera. FIG. 5 is a partially enlarged view of a shade portion (e.g., portion 53M) of the color separation unit 50. A holder 52 is provided with three open portions aligned along the moving direction of the color separation unit 50. A red color filter 53, a green color filter 54 and a blue color filter 55 are attached to the three open portions, respectively, and are arranged in sequence from the red color filter 53 to the blue color filter 55 with the green color filter 54 in between. The red color filter 53, the green color filter 54 and the blue color filter 55 have centermost recording areas 53P, 54P and 55P, respectively, though which the light from the photographing lens 11 passes through, and shading portions 53M, 54M and 55M at each of the right and left sides of the recording areas which prevent the light from passing through.

The red color filter 53 is provided with an L-shaped slot 53L at the lower portion of each of the shading portions 53M (see FIG. 5). The green color filter 54 and the blue color filter 55 have L-shaped slots 54L and 55L, respectively. The slots 54L and 55L are also provided at the lower portions of their respective shading portions 54M and 55M. In FIG. 4 and FIG. 5, the oblique hatching indicates the shading portions 53M, 54M and 55M. After the light emitted from the light source 71 is reflected at the first mirror 48, the reflected light passes through the hole 22C of the shutter unit 22 and through the L-shaped slots 53L, 54L and 55L of each of the color filters of the color separation unit 50, and is then directed to the recording medium unit 30.

Figure 6:
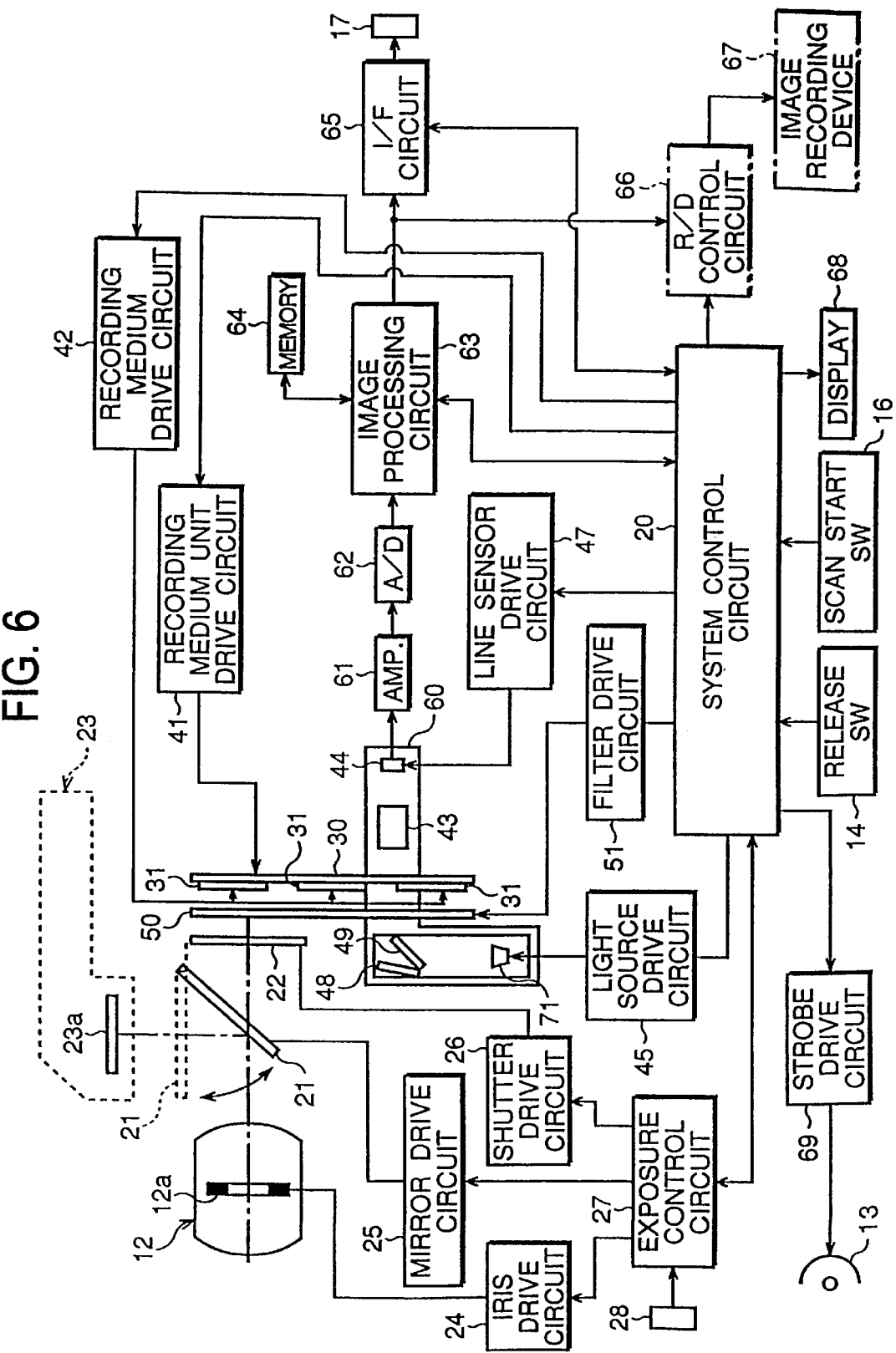
FIG. 6 illustrates a block diagram of the electro-developing type video camera of the first embodiment.

FIG. 6 is a block diagram of this embodiment. A system control circuit 20, including a micro-computer, is mounted to control the electro-developing type video camera as a whole.

The photographing optical system 12 has a plurality of lens groups and an aperture 12a. The color separation unit 50 and the recording medium unit 30 are disposed behind the photographing optical system 12, and a quick return mirror 21 is placed between the photographing optical system 12 and the color separation unit 50.

A shutter unit 22 is provided between the quick return mirror 21 and the color separation unit 50. A focusing glass 23a included in a view-finder optical system 23 is disposed above the quick return mirror 21.

The aperture 12a, the quick return mirror 21 and the shutter unit 22 are driven by an iris drive circuit 24, a mirror drive circuit 25 and a shutter drive circuit 26, respectively, all of which are controlled by an exposure control circuit 27.

The exposure control circuit 27 is operated in accordance with a command signal outputted by the system control circuit 20. Namely, when an exposure is controlled, the opening degree of the aperture 12a is adjusted by the iris drive circuit 24, under control of the exposure control circuit 27 and based on an output signal of the photometry sensor 28.

The quick return mirror 21 is usually set at a down position (an inclined position shown by the solid lines in the drawing), so that a light beam passing through the photographing optical system 12 is directed to the view-finder optical system 23. When a photographing operation is carried out, the quick return mirror 21 is rotated upwards by the mirror drive circuit 25 and set at an up position (a horizontal position shown by the broken lines in the drawing).

The light beam passing area 22A of the shutter 22 is usually closed by a shutter blind. When a photographing operation is performed, the shutter 22 is opened for a predetermined period of time by the shutter drive circuit 26 under control of the exposure control circuit 27. Thus, the light beam passing through the photographing optical system 12 passes through the color separation unit 50, and is directed to a light receiving surface of the electro-developing recording mediums 33, 34 and 35 of the recording medium unit 30.

The color separation unit 50 is driven by a filter driving circuit 51. The recording medium unit 30 is driven by a recording medium unit drive circuit 41. The units 30 and 50 are movable along the vertical axis of the camera body within a plane which is vertical to the optical axis of the photographing optical system 12. Circuits 41 and 51 are controlled by a command signal outputted from the system control circuit 20.

An electric voltage is applied to the electro-developing recording mediums 33, 34 and 35 under the control of a recording medium drive circuit 42. By exposing the electro-developing recording mediums 33, 34 and 35 while applying the voltage, an image is formed by the photographing optical system 12 is electronically developed on the electro-developing recording mediums 33, 34 and 35 as a visible image. Note that the recording medium drive circuit 42 is operated in accordance with a command signal outputted by the system control circuit 20.

A scanning unit 60 is provided close to the electro-developing recording medium unit 30. The scanning unit 60 includes the light unit 70, the imaging optical system 43 and the line sensor 44. The light unit 70 includes the light source 71, including a light emitting element, such as, for example, an LED, the first mirror 48 and the second mirror 49.

The line sensor 44 may be a one dimensional CCD sensor of 2000 pixels, for example. Since the recording medium unit 30 can be moved along the vertical axis of the camera body, the images developed by the electro-developing recording mediums 33, 34 and 35 are illuminated by the light source 71 and formed on the light receiving surface of the line sensor 44 via the imaging optical system 43.

ON-OFF control of the light source 71 is performed by a light source drive circuit 45. Control of the reading operation of the pixel signal generated in the line sensor 44 is performed by a line sensor drive circuit 47. Control of the movement of the recording medium unit 30 is performed by the recording medium unit drive circuit 41. The circuits 41, 45 and 47 are controlled by the system control circuit 20.

A pixel signal read out from the line sensor 44 is amplified by an amplifier 61, and is converted to a digital signal by an A/D converter 62.

The digital pixel signal is subjected to shading correction, gamma correction and so on, by an image processing circuit 63 under the control of the system control circuit 20, and is then temporarily stored in a memory 64. The memory includes an EEPROM in which correction data for the shading correction is stored. Note that the memory 64 may have a storage capacity equal to one horizontal scanning line outputted from the line sensor 44, or it may have a storage capacity of one frame's worth of image signals.

The pixel signal output from the memory 64 is input into an interface circuit 65 through the image processing circuit 63, so that the pixel signal is subjected to a predetermined process such as format conversion. The pixel signal may be outputted to an external display device (not shown) through the output terminal 17. The pixel signal output from the image processing circuit 63, is subject to a predetermined process such as image compression and format conversion by a recording device control circuit 66, so that the pixel signal can be recorded onto a data recording medium such as an IC memory card in an image recording device 67. The interface circuit 65 and the recording device control circuit 66 are operated in accordance with command signals output from the system control circuit 20.

The release switch 14 and the scan start switch 16 are connected to the system control circuit 20. A photographing operation is performed by the operation of the release switch 14. A reading operation by which an image signal is read from the electro-developing recording mediums 33, 34, 35 is performed in accordance with the operation of the scan start switch 16. Further, a display device 68 for indicating various setting conditions of the still video camera, and a strobe drive circuit 69 for controlling the light emitting operation of a strobe 13, are connected to the system control circuit 20.

Figure 7:
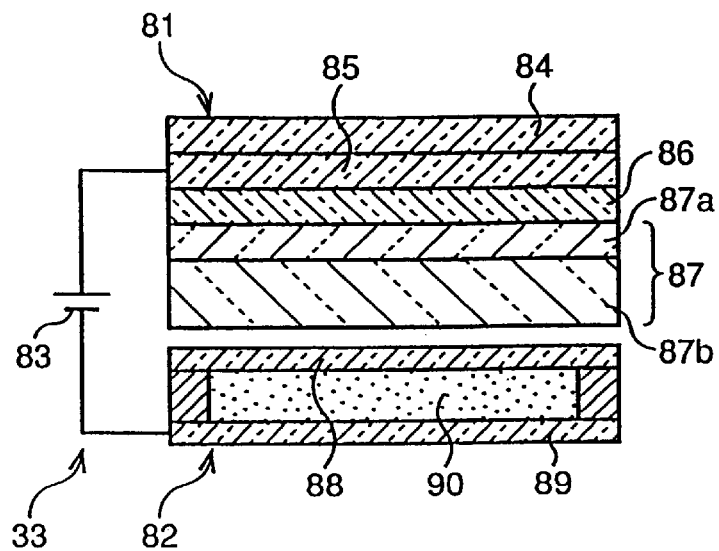
FIG. 7 illustrates a schematic cross-sectional view showing a structure of an electro-developing recording medium used in the electro-developing type video camera shown in FIG. 1.

FIG. 7 shows a structure of the electro-developing recording mediums 33, 34, 35 and is the same as that shown in Japanese Unexamined Patent Publication No. HEI 5-2280.

The electro-developing recording medium 33 (as an example) has an electrostatic information recording medium 81 and an electric charge keeping medium 82, and an electric voltage is applied thereto by an electric power source 83. The electrostatic information recording medium 81 is formed by laminating a glass base plate 84, an electrode layer 85, an inorganic oxide material layer 86 and a photoconducting layer 87. The photoconducting layer 87 is formed by laminating an electric charge generating layer 87a and an electric charge transferring layer 87b. The electric charge keeping medium 82 is formed by confining liquid crystal 90, which is a smectic liquid crystal, between a liquid crystal supporting plate 88 and a liquid crystal electrode layer 89. The electric charge transferring layer 87b of the photoconducting layer 87 and the liquid crystal supporting plate 88 of the electric charge keeping medium 82 face each other with a small gap between them.

An ON-OFF condition of the electric power source 83 is controlled by the recording medium drive circuit 42 (see FIG. 6). When the electric power source 83 is turned on, an electric voltage is applied between the electrode layer 85 and the liquid crystal electrode layer 89, i.e., between the electrostatic information recording medium 81 and the electric charge keeping medium 82. When the electrostatic information recording medium 81 is exposed while the electric voltage is applied, an electric charge is generated in the electrostatic information recording medium 81 in accordance with an image formed thereon. Since the intensity of the electric field applied to the liquid crystal 90 is changed in accordance with the electric charge, the image is indicated on the liquid crystal 90 as a visible image, and thus, an image of an object is developed. Namely, the visible image is generated in accordance with the electric charge.

The electric charge keeping medium 82 is a liquid crystal display having a memory-type liquid crystal such as a smectic liquid crystal, and thus, the developed visible image is kept therein even if the electric field is removed. In the liquid crystal, the developed visible image can be deleted by heating the liquid crystal, using a heating device (not shown) at a predetermined temperature. Thus, the same electric charge keeping medium 82 can be used repeatedly.

Figure 8:
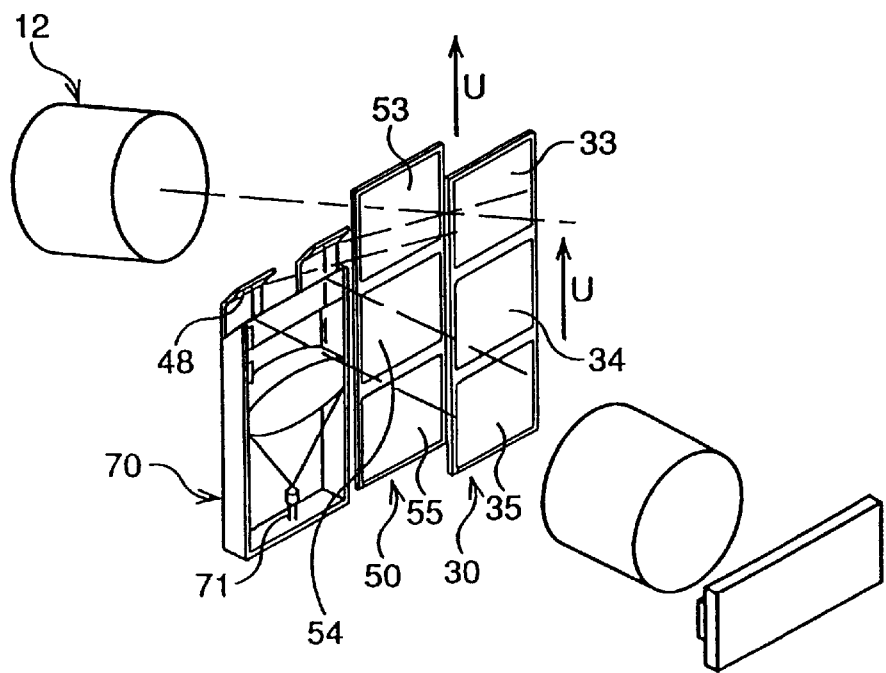
FIG. 8 illustrates a perspective view, with certain elements omitted, showing positions of some elements of the electro-developing type video camera shown in FIG. 1, when a red color component is recorded.
Figure 9:
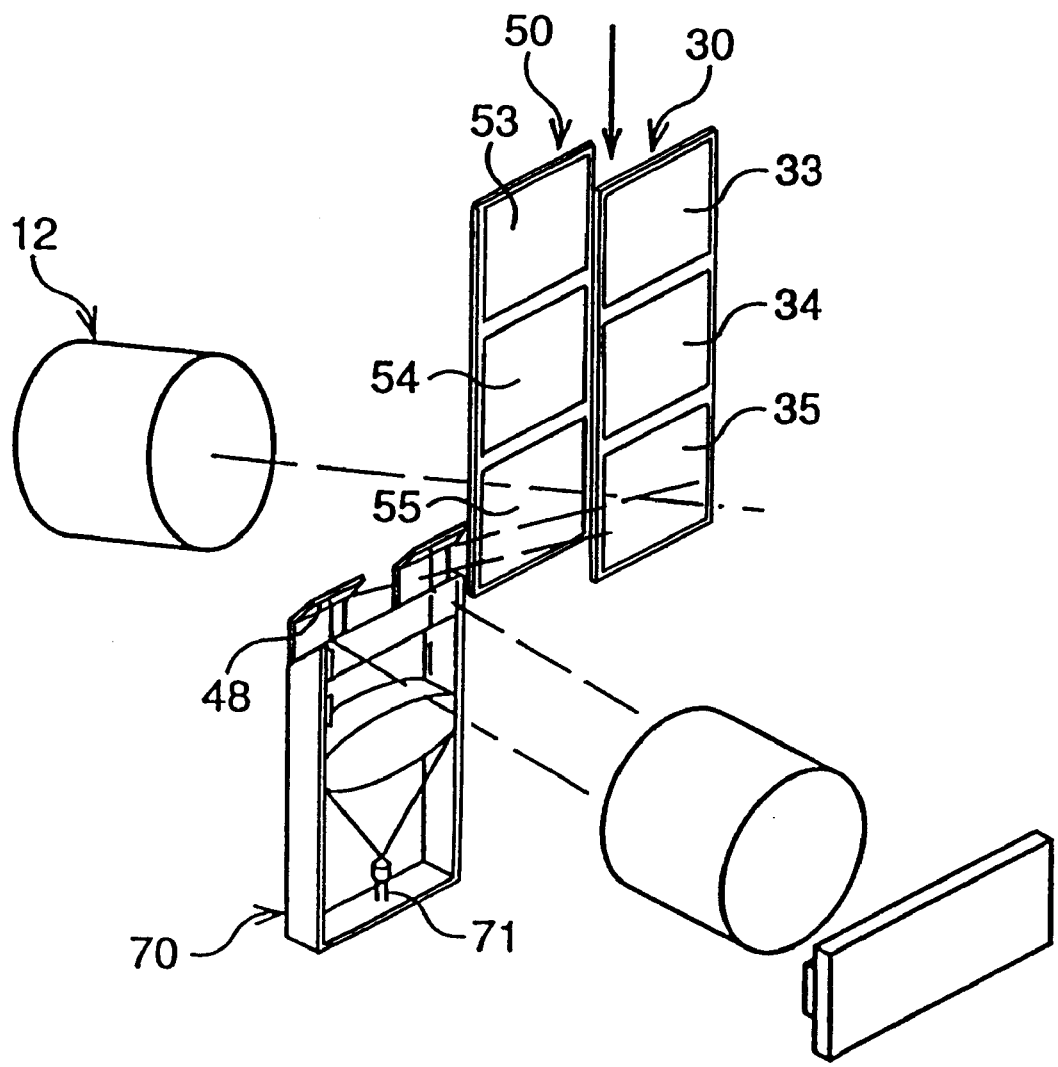
FIG. 9 illustrates a perspective view, with certain elements omitted, showing positions of some elements of the electro-developing type video camera shown in FIG. 1, when a blue color component is recorded.

FIG. 8 and 9 show perspective views of the positional relation among the photographing optical system 12, the lighting unit 70, the color separation unit 50 and the recording medium unit 30 of this embodiment, while a photographing operation is performed. For purposes of clarity, the shutter unit 22 is not shown in FIGS. 8 or 9. However the shutter unit 22 is provided between the photographing optical system 12 and the color separation unit 50 as shown in FIG. 1.

When a release button (not shown) is pushed, the shutter unit 22 opens and closes three times, and the color separation unit 50 and the recording medium unit 30 are moved in synchronization with each other, whereby the color components (R, G, B) are separated and respective optical images corresponding to each color component are recorded on the recording mediums.

FIG. 8 shows that the recording operation of the red optical component is performed at the first opening period of the shutter. The light passing through the photographing optical system 12 passes through the photographing area 53P of the red color filter 53 (see FIG. 4) and is directed to the recording medium unit 30. The red color component is recorded on the photographing area 33P of the red color recording medium 33 (see FIG. 3). At the same time, the lighting beam emitted from the light source 71 is reflected by the first mirror 48 and passes through the hole 22C provided in the shading portion 22B of the shutter unit 22. Further, the light passes through an L-shaped slit 53L of the shading portion 53M of the red color filter 53, and is directed to the recording medium unit 30. Accordingly, an L-shaped mark is recorded in the marking area 33M of the red color recording medium 33.

Subsequently, the shutter is closed, and the color separation unit 50 and the recording medium unit 30 are moved in the direction U (as shown in FIG. 8) for a predetermined distance. Namely, the color separation unit 50 and the recording medium unit 30 are positioned so that the light from the photographing optical system 12 passes through the shutter unit 22 and the green color filter 54 and is directed to the green color recording medium 34 of the recording medium unit 30. Then, the second shutter opening operation is performed, and the green color component is recorded in the same way as the red color component is recorded. Namely, the green color optical component of the light passing through the photographing optical system 12 is recorded in the photographing area 34P of the green recording medium 34, while at the same time the light emitted from the light source 71 passes through the L-shaped slit 54L of the shading portion 54M of the green color filter 54 and is directed to the recording medium unit 30. Accordingly, an L-shaped mark is recorded in the marking area 34M of the green recording medium 34.

After that, the shutter is closed, and the color separation unit 50 and the recording medium 30 are moved in the direction U (as shown in FIG. 8) for a predetermined distance. Namely, the color separation unit 50 and the recording medium unit 30 are positioned so that the light passing through the photographing optical system 12 passes through the shutter unit 22 and the blue color filter 55 and is directed to the blue color recording medium 35 of the recording medium unit 30. Then, the third shutter opening operation is performed, the blue color component is recorded in the same way as the red and green color components were recorded. Namely, the blue color optical component of the light passing through the photographing optical system 12 is recorded in the photographing area 35P of the blue recording medium 35, while at the same time the light emitted from the light source 71 passes through the L-shaped slit 55L of the shading portion 55M of the blue color filter 55 and is directed to the recording medium unit 30. Accordingly, an L-shaped mark is recorded in the marking area 35M of the blue recording medium 35.

Figure 10:
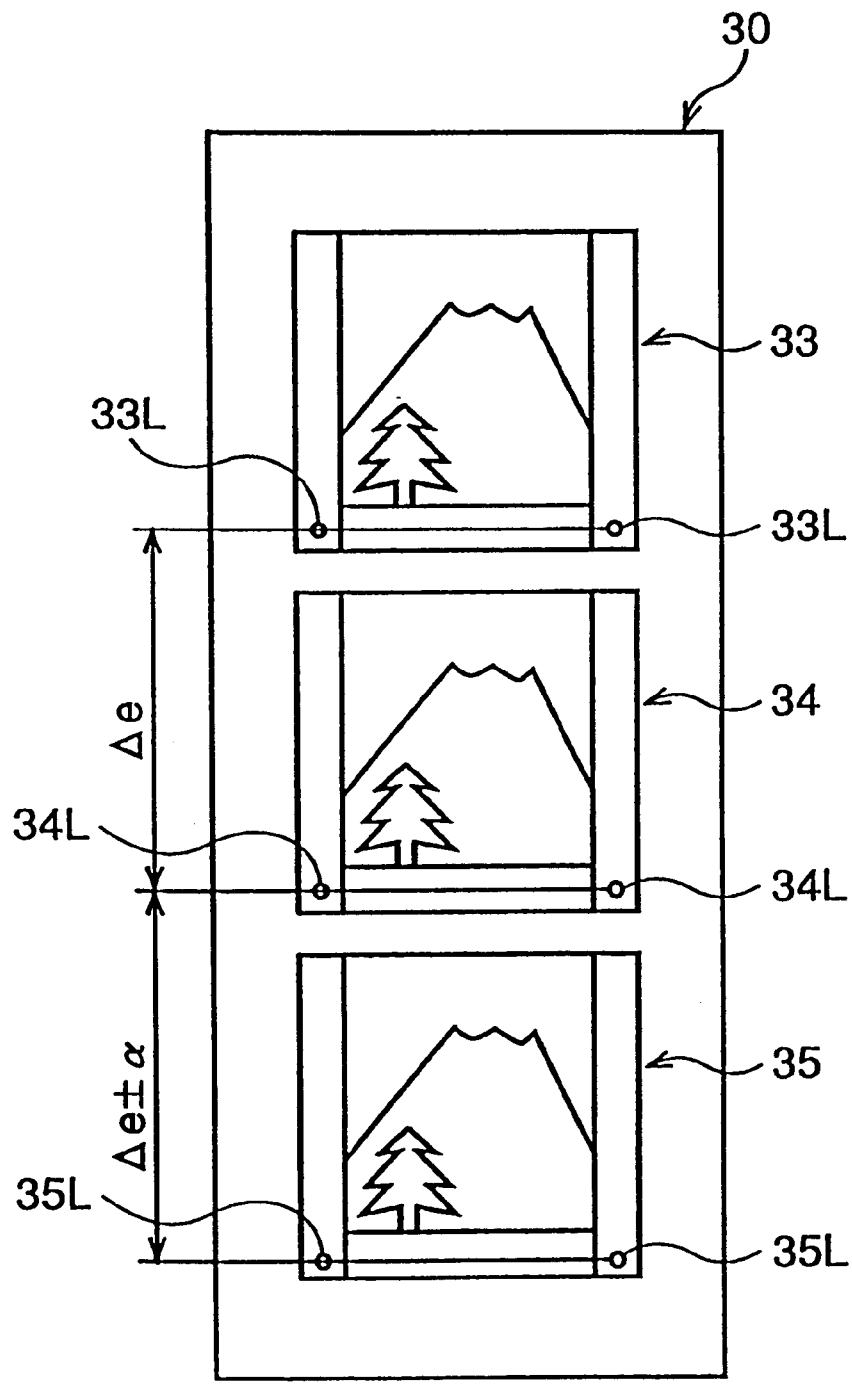
FIG. 10 illustrates a front view of the recording medium unit after photographing.

After the above-mentioned process, the optical components and the L-shaped marks are recorded on the recording mediums 33, 34, 35 respectively as shown in FIG. 10.

Figure 11:
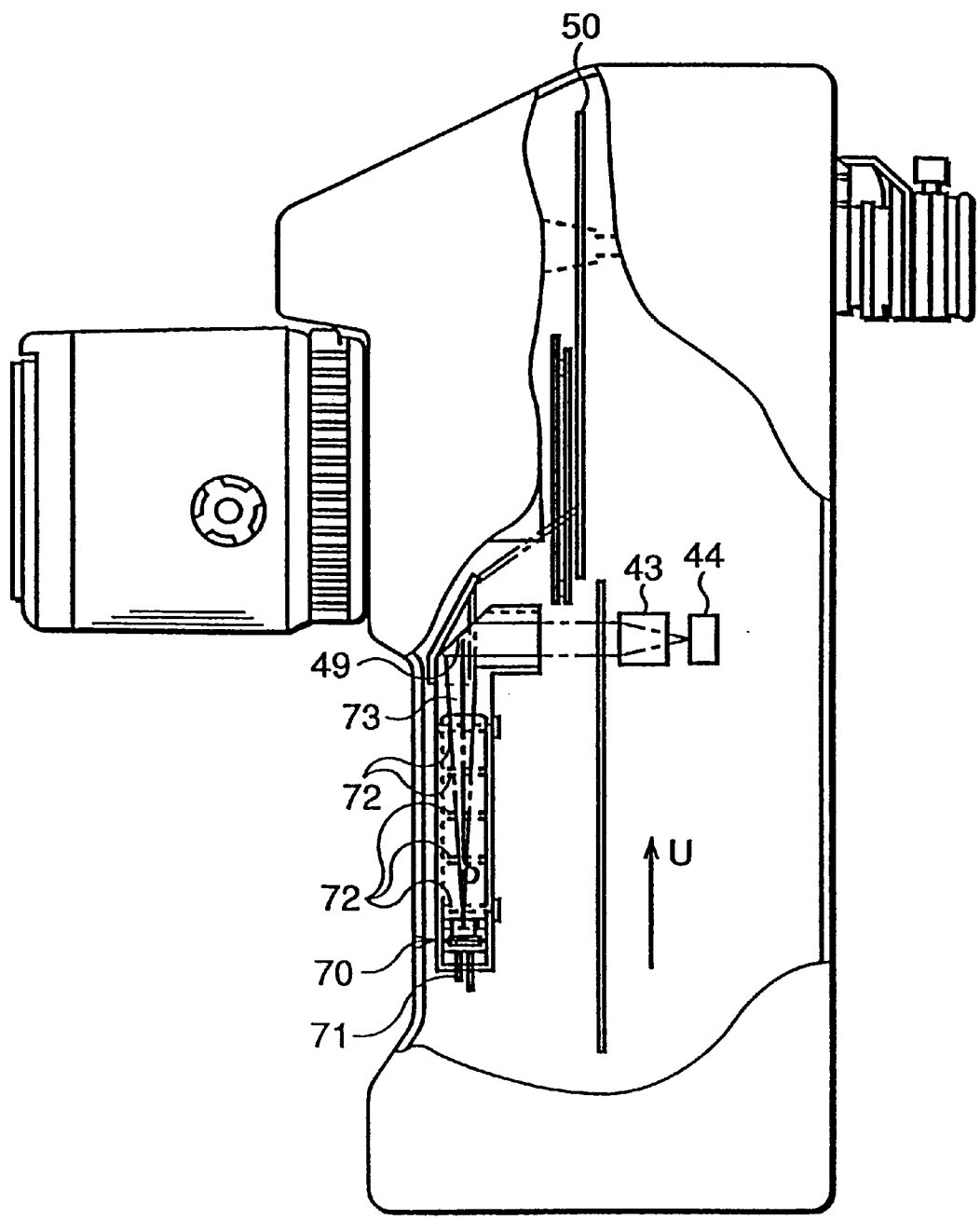
FIG. 11 illustrates a partially-cut-away sectional view of the first embodiment of the electro-developing type video camera according to the present invention, while scanning the red color optical component.

The reproducing operation is described as follows:

FIG. 11 is a partially sectioned view of the electro-developing type video camera of this embodiment, while in the process of scanning the recording mediums 33, 34 and 35 to reproduce the image data recorded on the recording medium. While scanning, the color separation unit 50 is set at an upper position, so that the light beam which is emitted from the light source 71 and reflected by the second mirror 49 can be directed to the recording medium unit 30.

Figure 12:
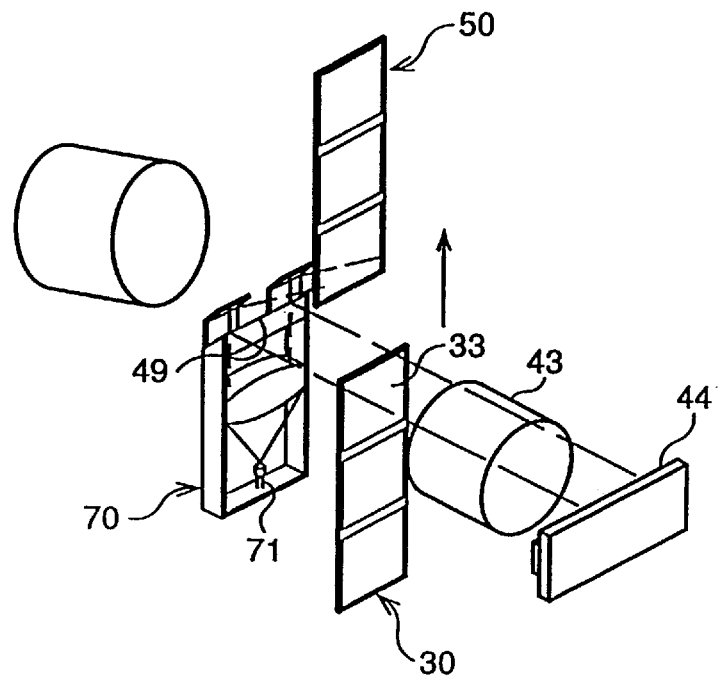
FIG. 12 illustrates a perspective view, with certain elements omitted, showing positions of some elements of the electro-developing type video camera shown in FIG. 1, when the red color component is scanned.
Figure 13:
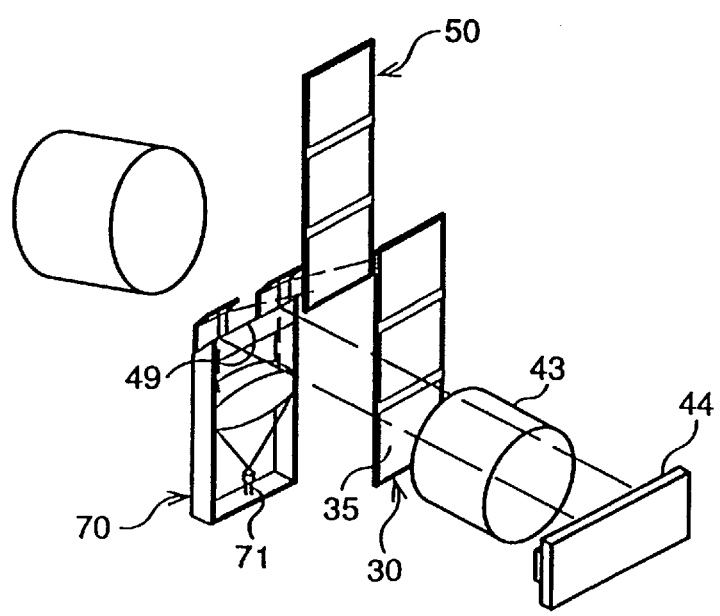
FIG. 13 illustrates a perspective view, with certain elements omitted, showing positions of some elements of the electro-developing type video camera shown in FIG. 1, when the blue color component is scanned.

The lighting beam directed to the recording medium unit 30 passes through the red color recording medium 33 (see FIG. 9), whereby one horizontal scanning line of the red color optical component of the optical image is formed, on the photo diode mounted on the line sensor 44, by the imaging optical system 43 (see FIG. 12). The pixel signal is read out from the optical image of one horizontal scanning line by the line sensor 44 and is subjected to a predetermined operation, and is stored in the memory 64. Subsequently, the recording medium unit 30 is moved in the direction U (as shown in FIG. 11) by one horizontal scanning line, the pixel signal of the next line is read out by the imaging optical system 43 and the line sensor 44, and is stored in the memory 64. Such operations are performed sequentially, with the previous line's pixel signal being stored in the memory 64. In this case, the data of the red optical component from each line scanned is stored in the memory 64.

After the scanning of the red color recording medium 33 is finished, the recording medium unit 30 is moved in the direction U (as shown in FIG. 11) by a predetermined distance and is positioned so that the lighting beam reflected by the second mirror 49 passes through the green color recording medium 34 (see FIG. 9). The scanning operation of the green color recording medium 34 is performed in a similar way to the scanning operation of the red color recording medium 33. Namely, the moving operation of the recording medium unit 30 in the direction U (as shown in FIG. 11) and the reading operation of the pixel signal of the optical image of one horizontal scanning line by the imaging optical system 43 and the line sensor 44 are performed in turns. The optical image of the green color optical component is stored in the memory 64.

After the scanning of the green color recording medium 33 is finished, the recording medium unit 30 is moved in the direction U (as shown in FIG. 11) by a predetermined distance and is positioned so that the lighting beam reflected by the second mirror 49 passes through the blue color recording medium 35 (see FIG. 9). The scanning operation of the blue color recording medium 34 is performed in a similar way to the scanning operation of the red color recording medium 33 and the green color recording medium 34. Namely, the moving operation of the recording medium unit 30 in the direction U (as shown in FIG. 11) and the reading operation of the pixel signal of the optical image of one horizontal scanning line by the imaging optical system 43 and the line sensor 44 are performed in turns. The optical image of the blue color optical component is stored in the memory 64.

The recorded data of the red, green and blue optical components are output to a peripheral hardware device which has a function of reproducing an image, in order to reproduce an image by synthesizing the red, green and the blue color optical components. For example, after the recorded data is subjected to an interface process, the recorded data can be output to the peripheral computer via an output terminal. Also, after the recorded data is subjected to an image compression process and a format converting process, the recorded data is recorded on a recording medium, such as, for example, a removable IC memory card. By connecting the IC memory card to the computer, the image can be reproduced.

When the recorded data of each color optical component is reproduced by a peripheral hardware device, both the object image and the L-shaped marks are reproduced. Accordingly, the L-shaped marks can be used as a visual aid to the operator to facilitate the combination of the 3 color images, so the complete image can be reconstituted without blurring. The L-shape has a 90° corner which accurately defines alignment, and thus a high quality color image is easily reproduced.

Figure 14:
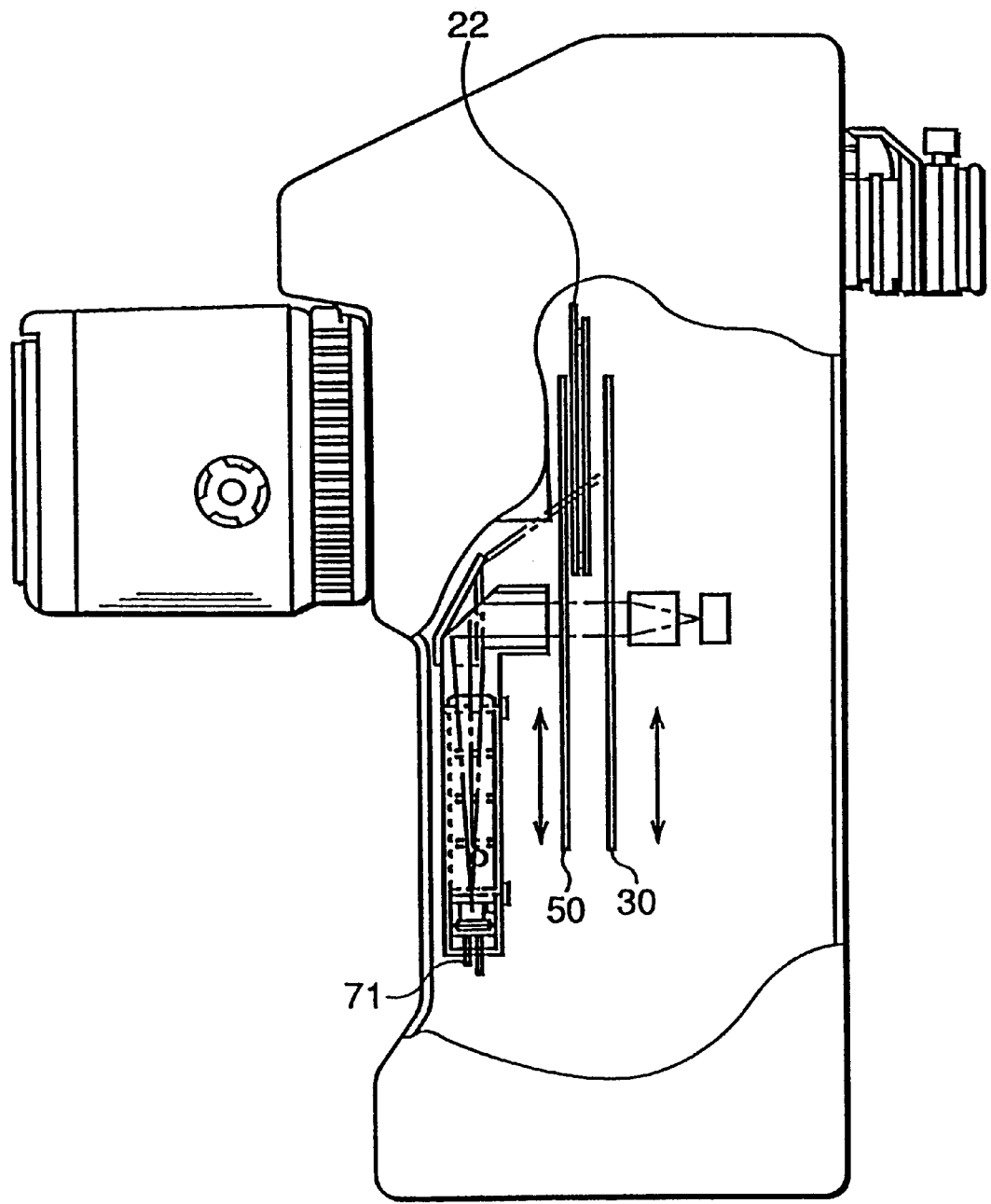
FIG. 14 illustrates a partially-cut-away sectional view of a second embodiment of an electro-developing type video camera according to the present invention.

FIG. 14 is a partially-cut-away sectional view of the electro-developing type video camera according to the second embodiment. In the second embodiment, the shutter unit 22 is positioned between the color separation unit 50 and the recording medium unit 30.

Figure 15:
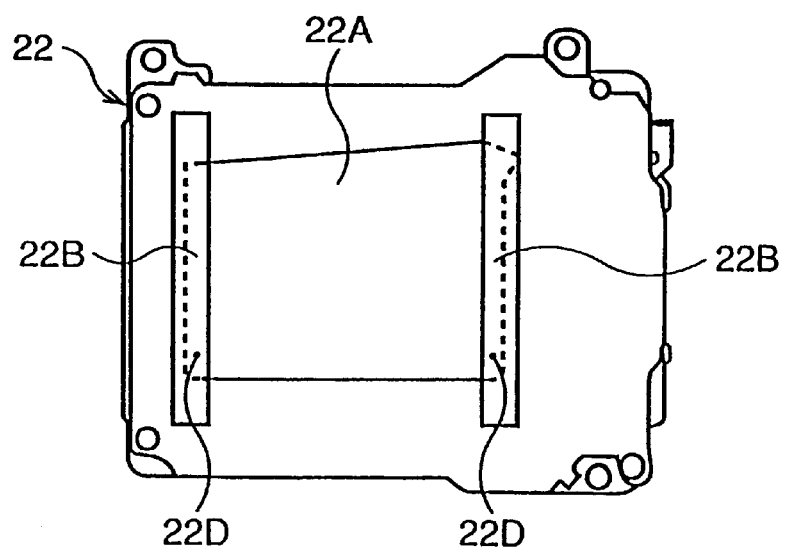
FIG. 15 illustrates a front view of a shutter unit based in the electro-developing type video camera of the second embodiment.

In the second embodiment, as shown in FIG. 15, a shading portion 22B of the shutter unit 22 is provided with an L-shaped slit 22D. While photographing, the light emitted from the light source 71 is reflected at the first mirror 48, passes through the color filter of the color separation unit 50 and the L-shaped slit 22D of the shutter unit 22, and is directed to the recording medium of the recording medium unit 30. L-shaped positioning marks for reproducing an image are recorded on the recording mediums. The other operations, for example, photographing operation and reproducing operation, are performed in a similar way to the first embodiment.

Figure 16:
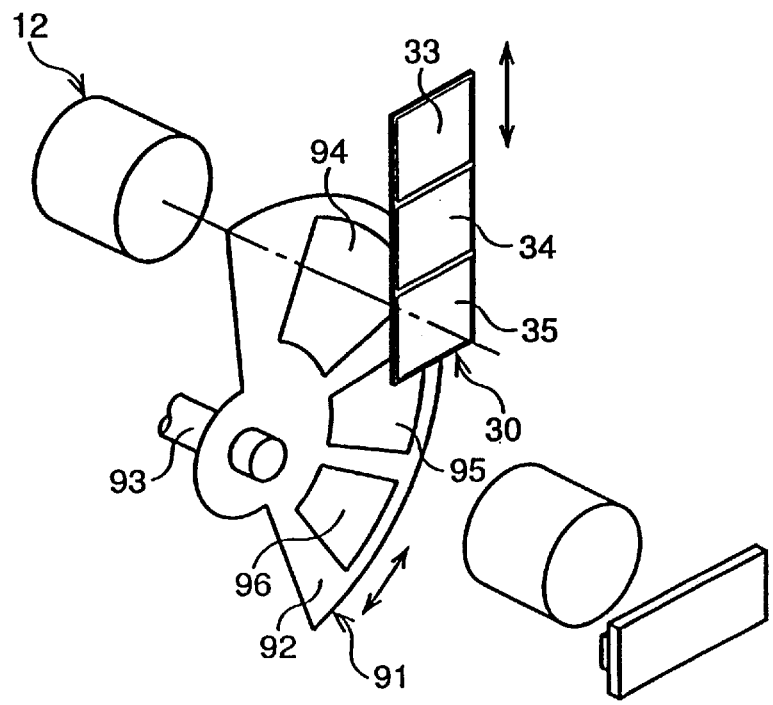
FIG. 16 illustrates a perspective view, with certain elements omitted, showing positions of some elements of an electro-developing type video camera of a third embodiment, according to the present invention, when the red color component is recorded.

FIG. 16 is a perspective view showing positions of some elements of an electro-developing type video camera of a third embodiment according to the present invention, when a red color component is recorded. As shown in FIG. 16, the color separation unit 91 comprises a semicircular holder 92 on which a red color filter 94, a green color filter 95, a blue color filter 96 are mounted. The red color filter 94, the green color filter 95 and the blue color filter 96 are arranged in a concyclic manner. A pivot 93 is mounted at the center of the circular arc of the semicircular holder 92. The semicircular holder 92 is rotated clockwise or counterclockwise in accordance with the rotation of the pivot 93. Each of the color filters is fan-shaped. Namely, each of the color filters is a section of a ring with circular arcs of approximately 60°. Each of the color filter is positioned in such a manner that the smaller circular arc is faced toward the pivot 93.

The other structures and the photographing operation are similar to that in the first embodiment. A release button (not shown) is pushed down, the shutter unit 22 is opened and closed three times in turns. The rotating operation of the color separation unit 91 and the moving operation of the recording medium unit 30 are performed in synchronization with the opening and closing of the shutter unit 22, whereby the recording operation of optical components and the marking operation by using the light emitted from the light source 71 (not shown) are performed.

Figure 17:
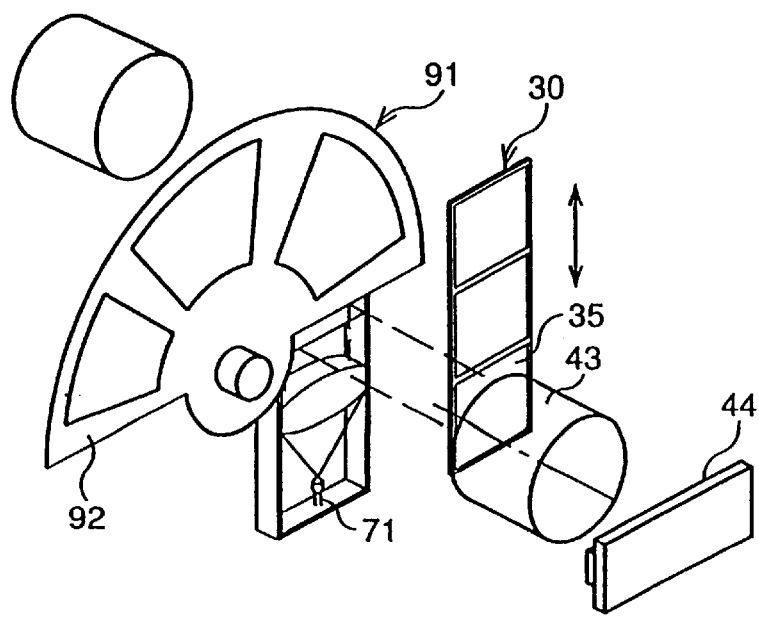
FIG. 17. illustrates a perspective view, with certain elements omitted, showing positions of some elements of an electro-developing type video camera of the third embodiment, when the red color component is scanned.

Further, a reproducing operation is performed in a similar way to the first embodiment. While reproducing the image, the semicircular holder 92 is rotated to a position at which the semicircular holder 92 does not prevent the light beam emitted from the light source 71 from being directed to the recording medium unit 30, as shown in FIG. 17.

Figure 18:
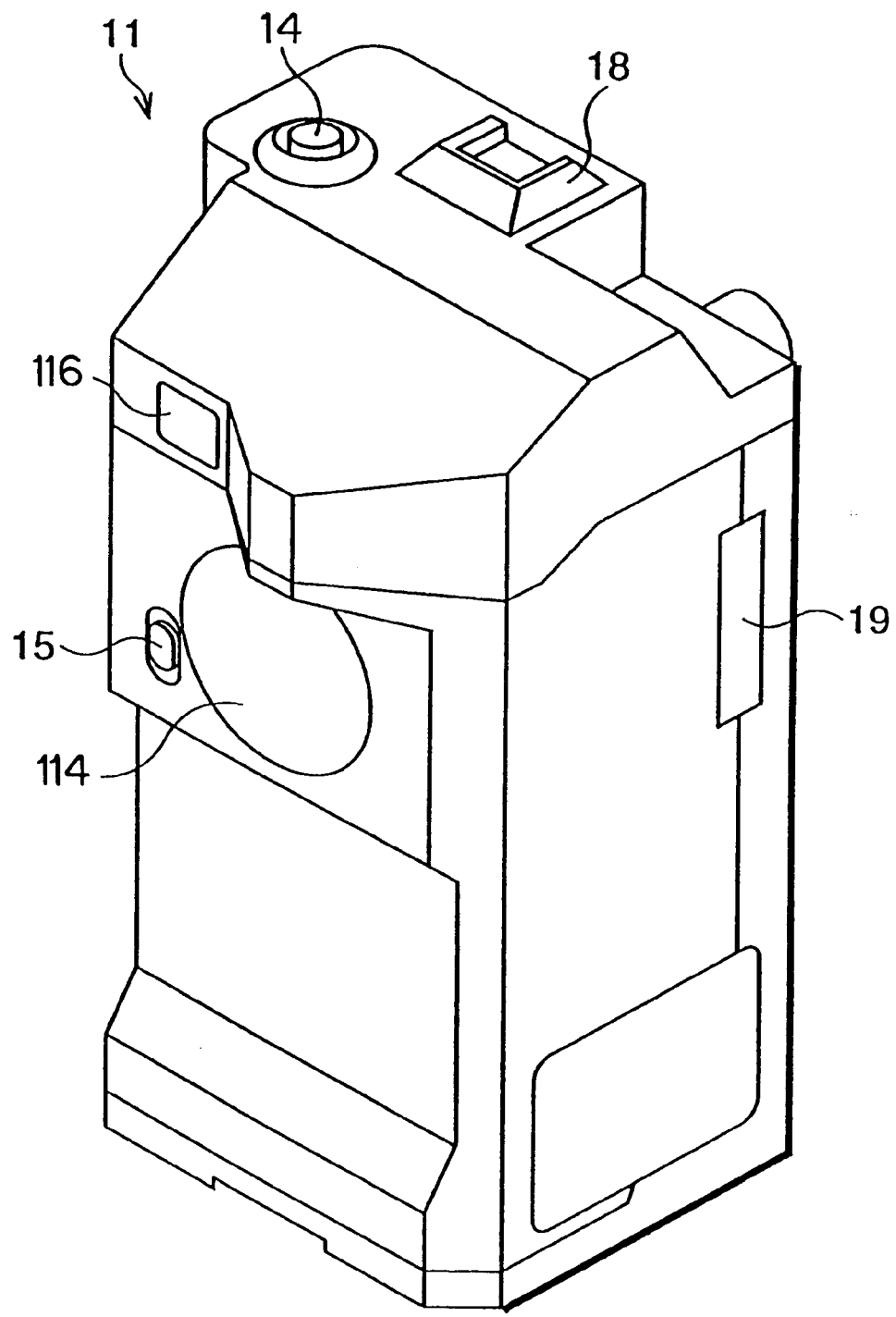
FIG. 18 illustrates an external view of an electro-developing type camera to which a fourth embodiment of the present invention is applied.

FIG. 18 illustrates an external view of an electro-developing type camera to which a fourth embodiment according to the present invention is applied.

When viewing a camera body 11 from the front side, a lens mount 114 provided for attaching an interchangeable lens (not shown) is located approximately at a center portion of the front surface of the camera body 11. A removal button 15 is provided beside the lens mount 114 so that the interchangeable lens can be removed from the lens mount 114 by pushing the removal button 15. A white balance adjusting window 116 is disposed on the left of and above the lens mount 114.

A flash attachment 18, on which an electronic flash can be attached, is provided on an upper surface of the camera body 11. A release button 14 is located beside the flash attachment 18.

A communication connector 19 is provided on a side surface of the camera body 11, so that image data can be transmitted from this camera to an external computer (not shown) and so on. A slot (not shown) is formed on a bottom surface, so that an electro-developing recording medium can be inserted into or ejected from the camera body 11.

Figure 19:
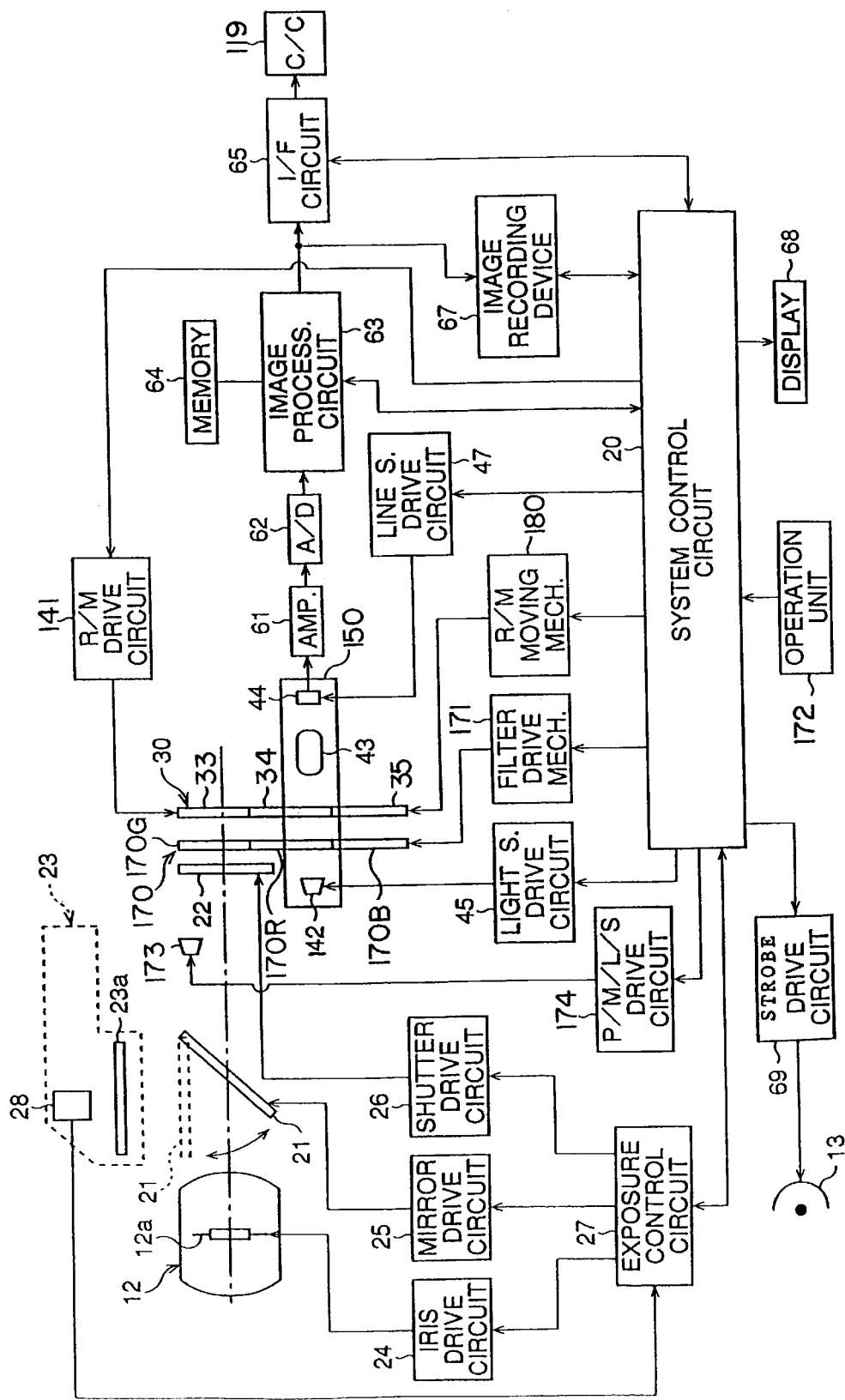
FIG. 19 illustrates a block diagram of the electro-developing type camera of the fourth embodiment.

FIG. 19 is a block diagram of the electro-developing type camera, in which a system control circuit 20, that includes a microcomputer is mounted to control the electro-developing type camera. Elements similar to the previously described embodiments employ like element numbers, and thus, a detailed description of such elements is omitted.

In the embodiment of FIG. 19, the electro-developing recording medium (recording medium unit) 30 is disposed behind the photographing optical system 12. A color filter (i.e., dichroic filter) 170 is provided in front of the recording medium unit 30. The quick return mirror 21 is placed between the photographing optical system 12 and the color filter 170. The shutter 22 is provided between the quick return mirror 21 and the color filter 170. In this embodiment, the photometry sensor 28 is disposed in the view-fade optical system to sense an amount of light led from the photographing optical system 12 through the focusing glass 23a in the view-finder optical system 23.

The recording medium unit 30 has a first recording area 33, a second recording area 34 and a third recording area 35. Each recording area corresponds to one frame's worth of an image. The color filter 170 includes a G (green) filter element 170G, a R (red) filter element 170R, and a B (blue) filter element 170B. Each filter element has the same size as the associated recording areas 33, 34 and 35; i.e., each filter element corresponds to one frame's worth of an image.

In this embodiment, a light beam passing through the photographing optical system 12 is directed to the view-finder optical system 23 to form an object image on the focusing glass 23a, and thus, an object to be photographed can be observed by the photographer through a finder optical system (not shown). When a photographing operation occurs, the quick return mirror 21 is rotated upwards by the mirror drive circuit 25 and set at the up position, so that the light beam is directed to the electro-developing recording medium (recording medium unit) 30. When this occurs, the light beam passing through the photographing optical system 12 falls upon a light receiving surface of the recording medium unit 30, to form a two-dimensional image thereon.

An electric voltage (i.e., a recording medium activating signal) is applied to the recording medium unit 30 under the control of a recording medium drive circuit 141, which corresponds to the recording medium drive circuit 42 of embodiment illustrated in FIG. 6. Since a detailed explanation of the operation of the recording medium drive circuit 42 was provided above, a detailed explanation of the operation of the recording medium drive circuit 141 is omitted.

A support member 150, which is fixed to a fixed frame (not shown), is provided close to the shutter 22. A main light source 142 (similar to the light source 71 illustrated in FIG. 6) the scanner optical system 43 and the line sensor 44 are supported by the support member 150. In this embodiment, the light source 142 comprises a plurality of photo diodes (e.g., LED's). The line sensor 44 may be of a suitable length to completely cover and extend over one horizontal scanning line of the image formed on the recording medium unit 30. The line sensor 44 serves as a photoelectric-conversion device, to convert an optical image to an electrical image.

In this embodiment, the scanner optical system 43 is disposed between the light source 142 and the line sensor 44. Further, the light source 142, the scanner optical system 43 and the line sensor 44 are arranged to be parallel to the optical axis of the photographing optical system 12.

The color filter 170 and the recording medium unit 30 are moved in a direction perpendicular to the optical axis of the photographing optical system 12. The color filter 170 and the recording medium unit 30 are moved by a filter drive mechanism 171 and a recording medium moving mechanism 180, respectively. The filter drive mechanism 171 and the recording medium moving mechanism 180 correspond to the filter drive circuit 51 and recording medium unit drive circuit 41, respectively, of the embodiment illustrated in FIG. 6, and thus, a detailed description is not repeated.

During the photographing operation, the color filter 170 and the recording medium unit 30 are moved as one, so that the centers of the G filter element 170G and the first recording area 33, the centers of the R filter element 170R and the second recording area 34, or the centers of the B filter element 170B and the third recording area 35 are positioned on the optical axis of the photographing optical system 12. Namely, G, R and B images are recorded in the first, second and third recording areas 33, 34 and 35, respectively.

When an image recorded on the recording medium unit 30 is read, the color filter 170 is fixed at a retracted position from the support member 150, such as, for example, proximate the side of the shutter 22. In this state, each of the recording areas 33, 34 and 35 is moved between the light source 142 and the scanner optical system 43 in a direction perpendicular to the optical axis of the scanner optical system 43. That is, the image recorded on the recording medium unit 30 is illuminated by the light source 142 and formed on the light receiving surface of the line sensor 44, through an operation of the scanner optical system 43.

ON and OFF control of the light source 142 is performed in a manner similar to the previously discussed embodiments. Pixel signals outputted from the image process circuit 63 are subjected to a predetermined process, such as an image compression and a format conversion in a recording device control circuit (not shown), so that the pixel signals can be recorded on a recording medium, such as, for example, a removable IC memory card, associated with the image recording device 67. The interface circuit 65 and the image recording device 67 are operated in accordance with a command signal outputted from the system control circuit 20.

An operation unit 172, comprising the release shutter (release switch) 14, a scan start switch (not shown), and so on, is connected to the system control circuit 20. The photography operation (recording operation), in which an image is recorded on the recording medium unit 30, and the reading operation, in which the image is read from the recording medium unit 30, are performed under the control of the operation unit 172.

Each of the G, R and B images read from the recording medium unit 30 are superimposed on one another, so that an image having a natural color is reproduced on a computer display monitor.

The relative position of each of the G, R and B images are adjusted with respect to one another. During the photographing operation, a positioning mark, indicating the relative position of each of the G, R and B images is recorded in a position beside (adjacent) each of the recording areas 33, 34 and 35. In order to form the positioning mark, a positioning mark light source 173 is provided at a portion close to a surface of the shutter 22, which surface faces the photographing optical system 12. That is, the positioning mark light source 173 emits a light beam by which the recording medium unit 30 is illuminated, so that a transmittance thereof is changed, whereby the positioning marks are recorded. ON and OFF control of the light source 173 is performed by a positioning mark light source drive circuit 174, which is operated based upon a command signal output by the system control circuit 20.

Figure 20:
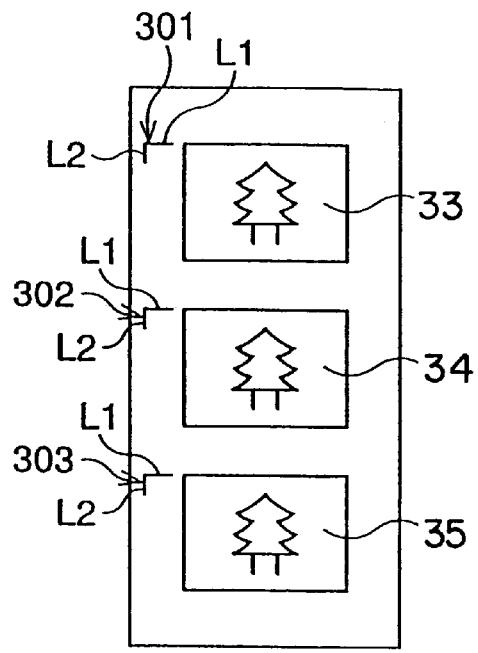
FIG. 20 illustrates a front view of an electro-developing recording medium.

FIG. 20 illustrates the electro-developing recording medium (recording medium unit) 30. The recording medium unit 30 comprises a rectangular plate, and is provided with the first, second, and third recording areas 33, 34 and 35, respectively, which are arranged vertically on the recording medium unit 30. In the recording medium unit 30 which has been recorded, positioning marks 301, 302, and 303 are formed at a portion close to left corners of the first, second and third recording areas 33, 34 and 35, respectively.

In the disclosed embodiment, the positioning mark 301 is L-shaped, and has a first linear portion L1, which extends horizontally from an upper end portion of the first recording area 33, and a second linear portion L2, which is perpendicular to the first linear portion L1. Namely, the first linear portion L1 is parallel to a longitudinal axis of the line sensor 44. In the present embodiment, the breadth of the first linear portion L1 is approximately 30 μm, for example, which is larger than a diameter (approximately 7 μm, for example) of a photo diode provided in the line sensor 44.

The positioning marks 302 and 303 corresponding to the second and third recording areas 34 and 35 have the same constructions as the positioning mark 301. Namely, each of the positioning marks 302 and 303 has the first linear portion L1, which extends horizontally from the upper end portion of the second and third recording area 34 and 35, respectively, and a second linear portion L2, which is perpendicular to the first linear portion L1.

Figure 21:
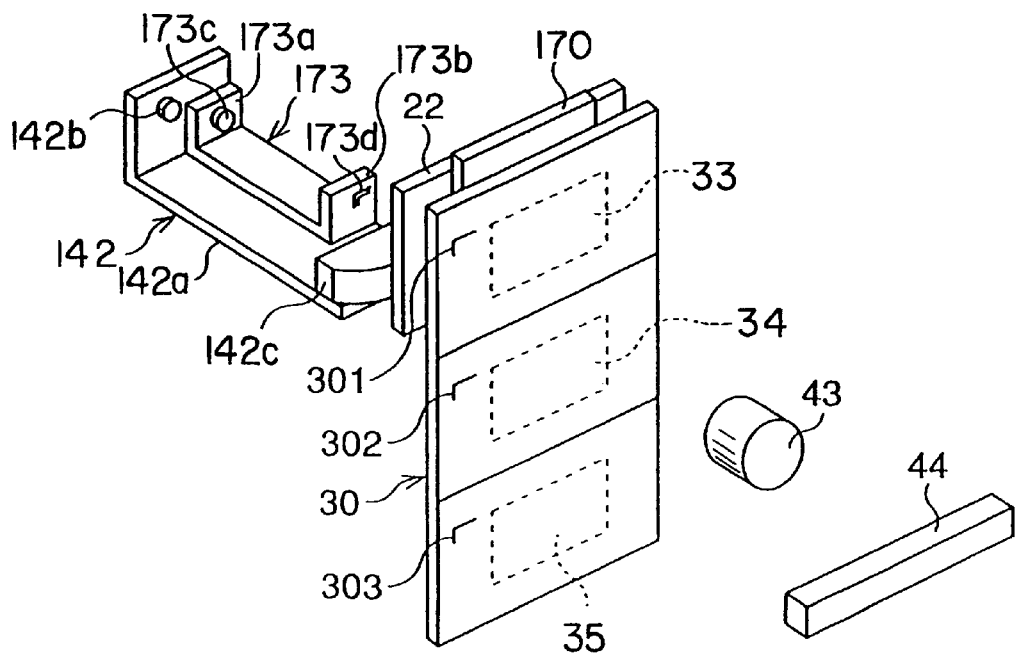
FIG. 21 illustrates a perspective view, showing constructions of a main light source and a positioning mark light source.

FIG. 21 illustrates the construction of the main light source 142 and the positioning mark light source 173 employed in this embodiment. The main light source 142 comprises support frame 142a, an LED 142b, and a lens 142c. LED 142b and the lens 142c are attached to the support frame 142a. Light emitted by the LED 142b enters the lens 142c. The illumination light passes through the lens 142c and appears as a linear strip extending in a horizontal direction for each of the recording areas 33, 34 and 35. The illumination light is a parallel light beam, which passes through the recording medium unit 30, and is condensed on the light receiving surface of the line sensor 44 by the scanner optical system 43.

The positioning mark light source 173 is located above the main light source 142. The positioning mark light source 173 has a support frame with a pair of flanges 173a and 173b. An LED 173c is attached to the first flange 173a, and an L-shaped slit 173d is formed in the second flange 173b. Light outputted by the LED 173c passes through the slit 173d, and is radiated onto a portion close to one of the recording areas 33, 34 or 35, but outside of the shutter 22. Although the emitted light of the LED 173c is a diffuse light, the emitted light has a high directivity, and a vague outline of the recorded positioning mark is restrained to a degree and a practical problem does not occur. Note that, in a state shown in FIG. 21, the main light source 142 is positioned so that the lens 142c faces the upper end of the second recording area 34, and the positioning mark light source 173 is set to face a portion close to a corner of the first recording area 33.

In the initial state of the photographing operation, as shown in FIGS. 19 and 21, the G filter element 170G and the first recording area 33 are positioned on the optical axis of the photographing optical system 12, i.e., behind the shutter 22. In this state, by opening and closing the shutter 22, a G image is recorded on the first G recording area 33. Further, in this recording operation, the positioning mark 301 is recorded on the upper side end of the first recording area 33 by the operation of the positioning mark light source 173.

When this recording operation ends, the color filter 170 and the recording medium unit 30 are moved upward as one, so that the R filter element 170R and the second recording area 34 are set to positions behind the shutter 22. Thus, an R image is recorded in the second recording area 34, and the positioning mark 302 is recorded on a side portion of the upper end of the second recording area 34.

Then, the color filter 170 and the recording medium unit 30 are moved up again, so that the B filter element 170B and the third recording area 35 are set to portions behind the shutter 22. Thus, a B image is recorded in the third recording area 35, and the positioning mark 303 is recorded in a side portion of the upper end of the third recording area 35.

One of the positioning marks 301, 302, or 303, recorded in the side portions of either the first, second, or third recording areas 33, 34 or 35, is used for determining whether a recording operation has been performed on the recording medium unit 30. This process will be described below. The position where the positioning mark light source 173 is located is adjusted so that each of the positioning marks 301, 302, and 303 substantially coincides with a reading start position where the line sensor 44 starts to read each of the images recorded in the recording areas 33, 34 and 35. Further, the position where the positioning mark light source 173 is attached is the initial position where a reading operation of the electro-developing recording medium (recording medium unit) 30 is started.

Figure 22:
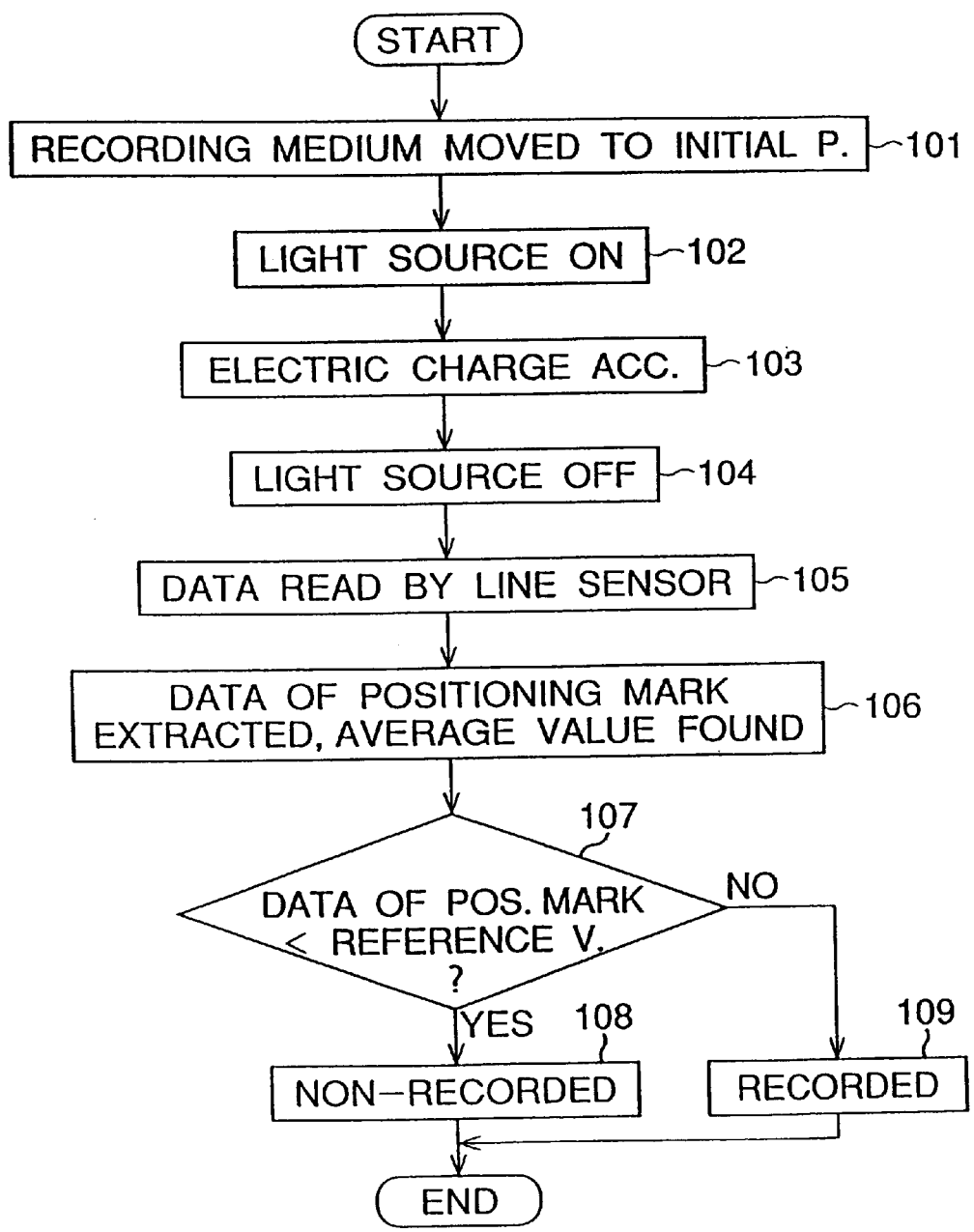
FIG. 22 illustrates a flow chart of a program for determining whether the electro-developing recording medium has been recorded.

FIG. 22 shows a flow chart of a program for determining whether a recording operation has been performed on the recording medium unit 30. This program is executed when the recording medium unit 30 is inserted in the camera body 11.

In Step 101, the recording medium unit 30 and the color filter 170 are moved to the initial positions thereof, so that the first recording area 33 and the G filter element 170G are set on the optical axis of the photographing optical system 12. In this state, the main light source 142 is positioned so that the lens 142c faces the upper end of the second recording area 34, and the positioning mark light source 173 is set to face a portion close to a corner of the first recording area 33.

In Step 102, the main light source 142 is turned ON. Thus, the LED 142b is lit. In Step 103, the line sensor 44 is operated, so that the electric charges are accumulated on each of the photo diodes of the line sensor 44 for a predetermined period of time, to sense the positioning mark 302 close to the second recording area 34. In Step 104, the main light source 142 is turned OFF.

In Step 105, pixel data detected by the line sensor 44 are read and stored in the memory 64. Since the position of the positioning mark 302 is coincident with the initial position where a reading operation of the R recording area 34 is started, the pixel data include data regarding the positioning mark 302 and data regarding the second recording area 34. In Step 106, the data regarding the positioning mark 302 are extracted from the pixel data. Namely, only image data corresponding to the position of the positioning mark are extracted from the pixel data detected by the line sensor 44. Further, in Step 106, the average value of the image data of the positioning mark 302 is found.

In Step 107, it is determined whether the data of the positioning mark 302 obtained in Step 106 is smaller than a reference value, i.e., whether the amount of light passing through the first linear portion L1 of the positioning mark 302 is smaller than the reference value. This amount of light corresponds to the transmittance of the first linear portion L1. When the transmittance is less than the reference value, it is determined that the recording medium unit 30 has not been exposed; i.e., a previous photographing operation has not occurred with respect to the recording medium unit under test. Accordingly, in Step 108, a message indicating that the recording medium unit 30 is a non-recorded medium is displayed by the display device 68. Conversely, when the transmittance is not less than the reference value, the recording medium unit 30 is determined to have been previously exposed (recorded on), and therefore, in Step 109, a message indicating that the recording medium unit 30 has been recorded is displayed by the display device 68. After Step 108 or 109 is executed, this routine ends.

As described above, in this embodiment, one of the positioning marks 301, 302, and 303 formed beside the recording areas 33, 34 and 35 is sensed, so that it is determined whether the recording medium unit 30 has been previously recorded. Namely, since no exclusive area is provided in the electro-developing recording medium (recording medium unit) 30 to form a mark indicating the recording of the electro-developing recording medium 30, an exclusive device for forming the mark does not need to be provided.

Figure 23:
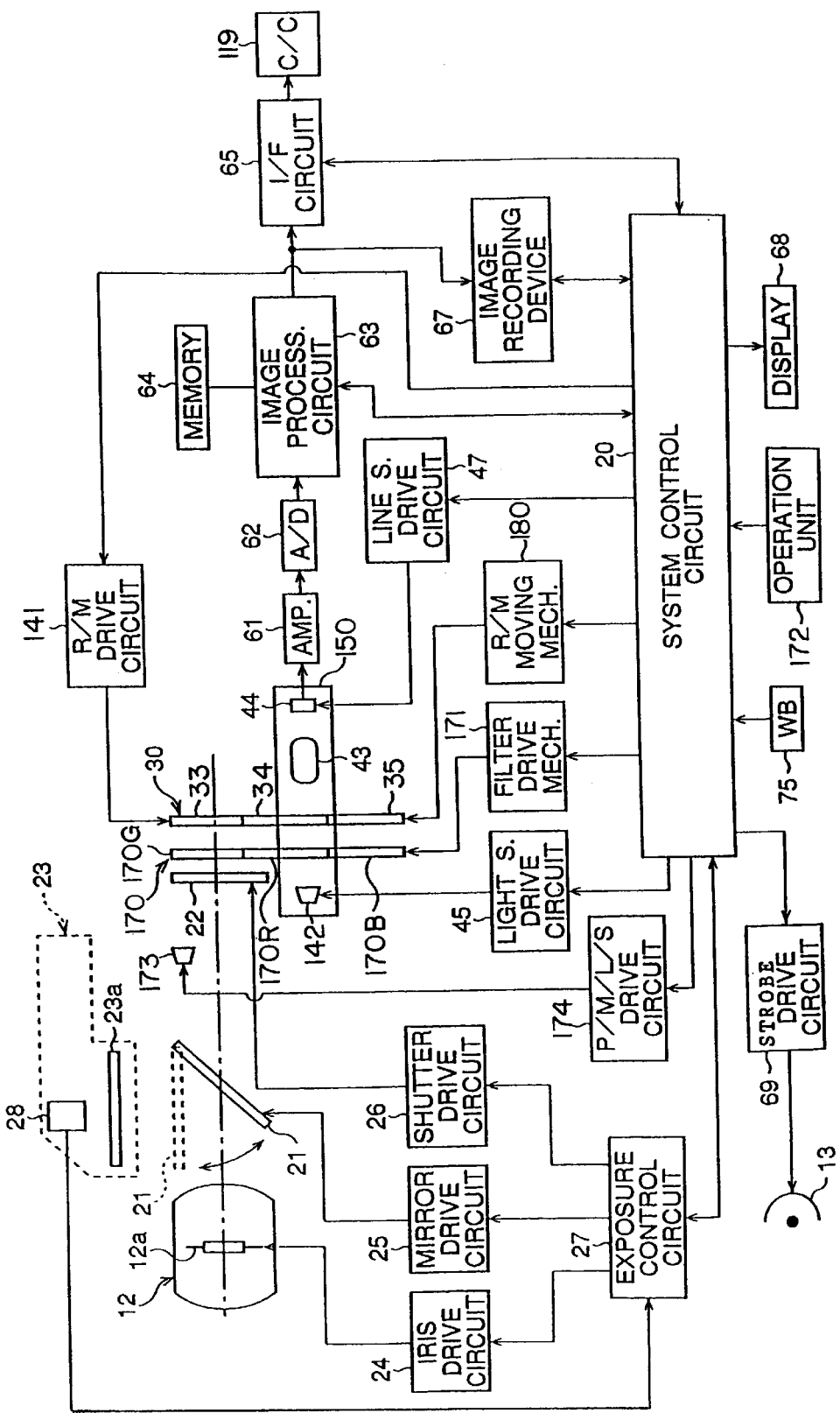
FIG. 23 illustrates a block diagram of an electro-developing type camera, according to a fifth embodiment of the present invention.

FIG. 23 illustrates a block diagram of the electro-developing type camera, to which a fifth embodiment of the present invention is applied. Note that an external view of the electro-developing type camera is the same as that shown in FIG. 18.

In this embodiment, a white balance sensor 75 is connected to the system control circuit 20, so that a color temperature of the ambient light of the object to be photographed is sensed. The other elements of this embodiment are the same as the previously described embodiments.

Similar to the fourth embodiment, when the recording medium unit 30 is recorded, as illustrated in FIG. 20, positioning marks 301, 302 and 303 are formed at a position close to (proximate) the left corners of the first, second and third recording areas 33, 34 and 35, respectively. In this embodiment, the transmittance of the positioning marks 301, 302 and 303 correspond to the color temperature information, as described below.

Namely, when the positioning marks 301, 302 and 303 are recorded beside the recording areas 33, 34 and 35, based on the color temperature of the ambient light of the object to be photographed, the electric current supplied to the LED 173c of the positioning mark light source 173 is set under the control of the system control circuit 20, for each of the recording areas 33, 34 and 35. Thus, the intensity of the light emitted from the LED 173c is changed in accordance with the color temperature, so that each of the positioning marks 301, 302 and 303 is formed to have a predetermined transmittance.

As will be described below, when the G component image is recorded to the first recording area 33, the positioning mark light source 173 is operated by a standard drive current H. When the R component image is recorded in the second recording area 34, the positioning mark light source 173 is operated by a drive current obtained by multiplying the standard drive current H by a first normalization coefficient. When the B component image is recorded in the third recording area 35, the positioning mark light source 173 is operated by a drive current obtained by multiplying the standard drive current H by a second normalization coefficient. That is, the positioning mark light source 173 and the transmittances of the positioning marks 301, 302 and 303 correspond to the color temperature. The color temperature is used to perform the white balance adjustment, when the G, R and B images recorded to the recording areas 33, 34 and 35 are superimposed to form a single color image.

Figure 24A:
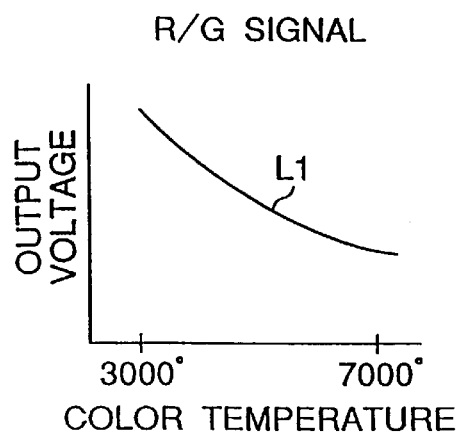
FIGS. 24A and 24B illustrate graphs showing output characteristics of a white balance sensor.
Figure 24B:
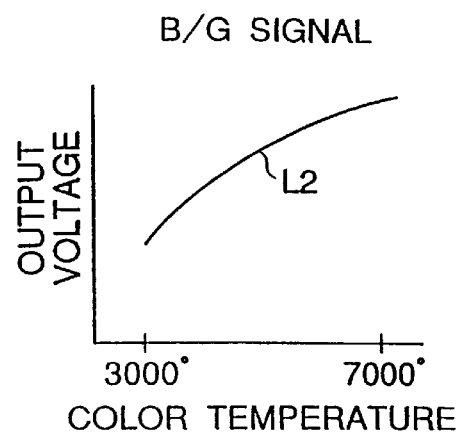
Figure 25A:
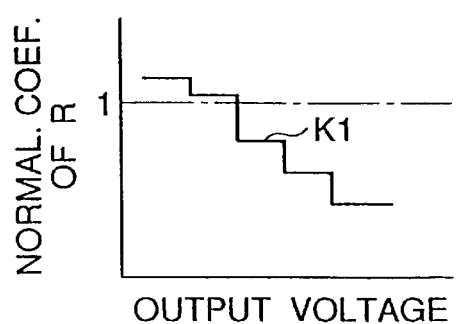
FIG. 25A illustrates a graph showing a relationship between output characteristics and a normalization coefficient corresponding to color temperature information of a second recording area.
Figure 25B:
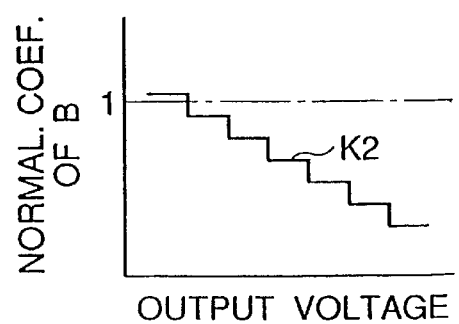
FIG. 25B illustrates a graph showing a relationship between output characteristics and a normalization coefficient corresponding to color temperature information of a third recording area.

FIGS. 24A and 24B illustrate output characteristics of the white balance sensor 75. FIG. 25A illustrate a relationship between the output characteristics and the normalization coefficient corresponding to the color temperature information regarding the second recording area 34. FIG. 25B illustrates a relationship between the output characteristics and the normalization coefficient corresponding to the color temperature information regarding the third recording area 35. Note that the normalization coefficients are stored in a memory of the system control circuit 20 in, for example, the form of a table.

The white balance sensor 75 outputs an R/G electric voltage signal and a B/G electric voltage signal. The R/G electric voltage signal represents the ratio of the R component and the G component contained in the incident light detected by the white balance sensor 75. The B/G electric voltage signal represents a ratio of the B component and the G component contained in the incident light detected by the white balance sensor 75.

The value of the R/G signal decreases as the color temperature increases, as shown by line L1 in FIG. 24A. The ratio of the R component included in the ambient light of the object decreases as the R/G signal decreases. When the R/G signal has a relatively small value, R/G color temperature information superimposed on the positioning mark 302, when the R image is recorded in the second recording area 34 (i.e., the first normalization coefficient corresponding to R) is set less than 1, as shown by reference K1 in FIG. 25A, so that the transmittance of the second positioning mark 302 has a relatively small value.

The value of the B/G signal increases as the color temperature increases, as shown by line L2 in FIG. 24B. The ratio of the component included in the ambient light of the object decreases as the B/G signal decreases. When the B/G signal has a relatively small value, a B/G color temperature information superimposed on the positioning mark 303, when the B image is recorded in the third recording area 35 (i.e., the second normalization coefficient corresponding to B) is set less than 1, as shown by reference K2 in FIG. 25B, so that the transmittance of the second positioning mark 303 has a relatively small value.

Based upon the normalization coefficients K1 and K2 obtained by the method described above, and the standard drive signal H, the drive current of the LED 173c of the positioning mark light source 173 for each of the first, second, and third recording areas 33, 34 and 35 is set to H, K1×H, K2×H, respectively.

FIG. 26 illustrates a timing chart of the recording operation and the reading operation. With reference to the drawing, an operation of the fifth embodiment will be described. Note that, before the recording operation is started, the electro-developing recording medium (recording medium unit) 30 is positioned at the initial position shown in FIGS. 19 and 21. Thus, the G filter element 170G faces the shutter 22 and the first recording area 33 faces the G filter element 170G (reference S10). Namely, the G filter element 170G and the first recording area 33 are positioned on the optical axis of the photographing optical system 12.

When it is determined that the release button 14 has been depressed (reference S11), an output signal of the photometry sensor 28 (i.e., a photometry value) is sensed, and a photometry calculation is performed based on the photometry value (reference S12). When a predetermined time has passed since the release button 14 is depressed, a recording medium activating signal corresponding to the first recording area 33 is set to an ON state (reference S13) so that a voltage is applied to the first recording area 33.

When the photometry calculation is completed, a white balance calculation is carried out based on the R/G signal and the B/G signal outputted from the white balance sensor 75, so that the normalization coefficients shown in FIGS. 25A and 25B are obtained (reference S14). Then, based on the result of the photometry calculation, the opening degree of the aperture 12a is changed from the fully open state to a predetermined opening degree (reference S15), and the quick return mirror 21 is changed from the down condition to the up-condition (reference S16). Upon the completion of the white balance calculation, the LED 173c of the positioning mark light source 173 is lit for a predetermined period (reference S17), so that a positioning mark 301 is formed beside the first recording area 33. Note that, when the positioning mark 301 corresponding to the first recording area 33 is formed, the amount of the light beam emitted by the LED 173c is a predetermined standard value corresponding to the standard drive current H, and is not changed in accordance with the color temperature.

When it is confirmed that the quick return mirror 21 has been changed to the up-condition and the opening degree adjustment of the aperture 12a has been completed, the shutter 22 is opened for an exposure period (reference S18) which is obtained by the photometry calculation (reference S12). Thereafter, the shutter 22 is closed. Thus, the G image is recorded in the first recording area 33.

When the shutter 22 is closed, the aperture 12a is fully opened (reference S19). At the same time, the quick return mirror 21 is changed from the up-condition to the down-condition (reference S20), and the recording medium activating signal is set to an OFF state (reference S21). Further, the color filter 170 and the recording medium unit 30 are moved upward by one frame's worth, so that the R filter element 170R and the second recording area 34 are positioned on the optical axis of the photographing optical system 12 (reference S22). Namely, the R filter element 170R faces the shutter 22 and the second recording area 34 faces the R filter element 170R.

When the color filter 170 and the recording medium unit 30 are moved up and the positionings thereof are completed, similar to the recording operation of the G image, the recording medium activating signal is set to the ON state (reference S31). The opening degree of the aperture 12a is adjusted (reference S32), and the quick return mirror 21 is changed to the up-condition (reference S33). Then, the LED 173c is lit for a predetermined period (reference S34), so that a positioning mark 302 is formed beside the second recording area 34. When the positioning mark 302 corresponding to the second recording area 34 is formed, the amount of the light beam emitted by the LED 173c is adjusted in such a manner that the transmittance of the positioning mark 302 corresponds to the color temperature of R/G.

When it is confirmed that the quick return mirror 21 has been changed to the up-condition and the opening degree adjustment of the aperture 12a has been completed, the shutter 22 is opened for an exposure period (reference S35) which is obtained by the photometry calculation (reference S12). Thus, the R image in the second recording area 34.

When the shutter 22 is closed, similar to the operation after the G image is recorded, the aperture 12a and the quick return mirror 21 are operated (references S36 and S37), and the recording medium activating signal is set to an OFF state (reference S38). Then, the B filter element 170B and the third recording area 35 are positioned on the optical axis of the photographing optical system 12 (reference S39).

When the placements of the color filter 170 and the recording medium unit 30 are completed, similar to the recording operation of the G image, the recording medium activating signal is set to the ON state (reference S41), the opening degree of the aperture 12a is adjusted (reference S42), and the quick return mirror 21 is changed to the up-condition (reference S43). Then, the LED 173c is lit for a predetermined period (reference S44), so that a positioning mark 303 is formed beside the third recording area 35. The amount of the light beam emitted by the LED 173c is adjusted in such a manner that the transmittance of the positioning mark 303 corresponds to the color temperature of B/G.

When it is confirmed that the quick return mirror 21 has been changed to the up-condition and the opening degree of the aperture 12a has been completed, the shutter 22 is opened for an exposure period (reference S45) which is obtained by the photometry calculation (reference S12). Thus, the G image is recorded in the third recording area 35.

When the shutter 22 is closed, similar to the operation after the G image is recorded, the aperture 12a and the quick return mirror 21 are operated (references S46 and S47), and the recording medium activating signal is set to an OFF state (reference S48).

When the scan start switch is operated to output the scanner drive signal (reference S51), the LED 142b of the main light source 142 is lit (reference S52). At the same time, the line sensor drive circuit 47 is operated, so that a power source of the line sensor 44 is set to an ON state (reference S53). On the other hand, the color filter 170 is retracted to a retract position by the filter drive mechanism 171, so that all of the filter elements 170R, 170G, and 170B are offset from the optical path of the main light source 142. The electro-developing recording medium (recording medium unit) 30 is moved so that the upper end of the first recording area 33 faces the main light source 142 (reference S54). Namely, the lens 142c of the main light source 142 faces the first recording medium 33 and the positioning mark 301 corresponding thereto.

In this state, the electric charge accumulation of the line sensor 44 is carried out for a constant period (reference S55). Then, the accumulated electric charge (i.e., the image signal) is outputted (reference S56). From this image signal, a mark image signal corresponding to the first linear portion L1 (see FIG. 20) of the positioning mark 301 is extracted, so that the transmittance of the positioning mark 301 corresponding to the G image is obtained.

Then, the electric charge accumulation of the line sensor 44 is again carried out (reference S57). When a constant period elapses, the line sensor 44 is moved up by a predetermined amount. During this movement of the line sensor 44, one horizontal scanning line's worth of image signal is outputted from the line sensor 44 (reference S58). Then, at the next position, similar to the above, the electric charge accumulation of the line sensor 44 is again carried out, and one horizontal scanning line's worth of image signal is outputted from the line sensor 44. Thus, the electro-developing recording medium 30 is repeatedly moved up and stopped, and during this movement, the G image is read from the electro-developing recording medium 30.

The electric charge accumulation of the line sensor 44 is performed for a predetermined constant period in the reading operation of the G image, and the transmittance of the positioning mark 301 obtained through the line sensor 44 is used for a control of the period of the electric charge accumulation in the reading operation of the R and B image signals.

When the reading operations of the first recording area 33 is completed, the main light source 142 is turned OFF (reference S61), and the electro-developing recording medium 30 is moved up (reference S62). When the upper end of the second recording medium 34 is set to face the main light source 142, the main light source 142 is turned ON (reference S63). Thus, the electric charge accumulation of the line sensor 44 is performed for a constant period (reference S64). Then, an image signal is outputted from the line sensor 44 (reference S65). From this image signal, a mark image signal corresponding to the first linear portion L1 of the positioning mark 302 is extracted, so that the transmittance of the positioning mark 302 corresponding to the R image is obtained. Based upon a ratio of this transmittance to the transmittance of the positioning mark 302 corresponding to the G image, the color temperature information of R/G is obtained, so that the electric charge accumulation period corresponding to the color temperature information is set.

Namely, in the reading operation of the R signal, the electric charge accumulation period of the line sensor 44 is controlled to have a length corresponding to the R/G color temperature (reference S66). The other operations are the same as the reading operation of the G signal.

When the reading operation of the second recording area 34 is completed, the main light source 142 is turned OFF (reference S71), and the electro-developing recording medium 30 is moved up (reference S72). When the upper end of the third recording medium 35 is set to face the main light source 142, the main light source 142 is turned ON (reference S73), and the electric charge accumulation of the line sensor 44 is performed for a constant period (reference S74). Thus, an image signal is outputted from the line sensor 44 (reference S75). From this image signal, a mark image signal corresponding to the first linear portion L1 of the positioning mark 303 is extracted, so that the transmittance of the positioning mark 303 corresponding to the B image is obtained. Based upon a ratio of this transmittance to the transmittance of the positioning mark 303 corresponding to the G image, the color temperature information of B/G is obtained, so that the electric charge accumulation period corresponding to the color temperature information is set.

Namely, in the reading operation of the B signal, the electric charge accumulation period of the line sensor 44 is controlled to have a length corresponding to the B/G color temperature (reference S76). The other operations are the same as the reading operations of the G and R signal.

As described above, in this embodiment, the transmittances of the positioning marks 301, 302, and 303 formed at portions close to the recording areas 33, 34 and 35 are controlled to correspond to the color temperature of the ambient light of the object. Namely, the color temperature information is superimposed on each of the positioning marks 301, 302, and 303. Then, when the images recorded in the recording areas 33, 34 and 35 are read, the electric charge accumulation period of the line sensor 44 is controlled in accordance with the color temperature information. Therefore, according to this embodiment, in the photographing operation, it is not necessary that the exposure period be separately adjusted for each of the G, R, and B images. Thus, control of the photographing operation is simplified.

Note that, when the images recorded in the recording areas 33, 34 and 35 are read, the amount of the light beam of the main light source 142 illuminating the recording areas 33, 34 and 35 can be controlled. Namely, in this construction illustrated in FIG. 26, the electric charge accumulation periods indicated by references S57, S66, and S76 are constant, and the amount of the light beam in the illuminating operation, indicated by references S52, S63, and S73, are controlled in accordance with the color temperature. That is, when, in the output signal of the white balance sensor 75, the R/G signal is relatively large, the amount of the light beam in reading the image of the second recording area 34 (corresponding to reference S63) is controlled to have a small value.

Figure 27:
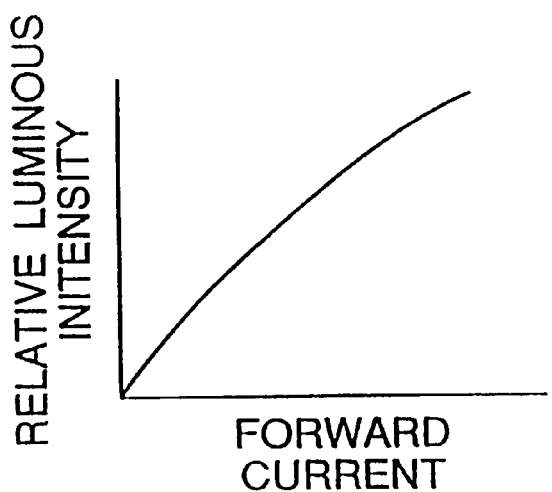
FIG. 27 illustrate a graph showing a relationship between an amount of forward current supplied to an LED and a relative luminosity of light emitted by the LED.
Figure 28:
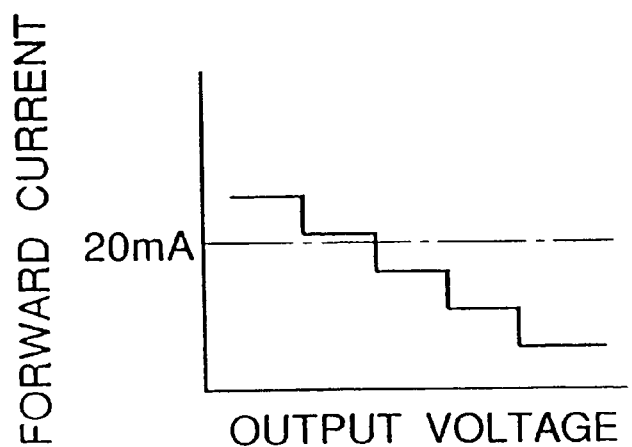
FIG. 28 illustrate a graph showing a relationship between an output voltage of the white balance sensor and the amount of forward current supplied to the LED.

FIG. 27 illustrates a relationship between an amount of forward current supplied to the LED 142b of the main light source 142 and a relative luminosity of light emitted by the LED 142 b. As shown in FIG. 27, the relative luminosity increases approximately in proportion to the forward current. Therefore, the amount of light emitted by the main light source 142 in reading the R image needs to be decreased as the R/G signal outputted from the white balance sensor 75 becomes larger, and such data (indicated in FIG. 28), for example, should be stored in a memory provided in the system control circuit 20. Namely, FIG. 28 corresponds to the graphs of the normalization coefficients shown in FIGS. 25A and 25B in the fifth embodiment.

In the disclosed embodiments, the positioning marks are L-shaped marks. However, they can be any other shape by which it is easily shown whether the positioning marks are placed on top of each other.

Further, the color filters are used for color separation. However, any other medium which separates red, green and blue color components from the optical image can be used.

Furthermore, the recording mediums are placed on the holder in such a manner that red, green, blue recording medium are aligned along the moving direction of the recording medium unit 30. However, they can be placed in a concyclic manner on a semicircular holder. By rotating the semicircular holder clockwise or counterclockwise, photographing and reproducing operations are performed.

As above mentioned, in the present invention, since each of the optical components and the positioning marks are recorded on each of the recording mediums respectively while photographing, the synthesization of the optical color components can be performed so that the positioning marks form one shape. Thus, the synthesizing operation is performed easily, and a high quality image is reproduced.

Further, since the light source for scanning can be used for recording the positioning marks, it is not necessary to include a second light source for marking the positioning marks. Accordingly, the structure of the electro-developing type video camera is simplified.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. HEI 8-53915 (filed on Feb. 16, 1996), Japanese Patent Application No. HEI 8-93108 (filed on Mar. 22, 1996), and Japanese Patent Application No. HEI 8-97593 (filed on Mar. 27, 1996), which are each expressly incorporated herein, by reference, in their entireties.

What is claimed:

1. A marking device of an electro-developing type video camera having a color separation optical system to sequentially color separate an object to be photographed into a plurality of color components, and an electro-developing recording medium having a plurality of optical image recording areas that electrically develop optical images corresponding to said color components, said marking device comprising:

a marking mechanism that sequentially forms positioning marks indicating a relative position of each of said optical images of an object developed in said plurality of optical image recording areas, said positioning mark being formed outside said optical image recording areas, said marking mechanism forms said positioning mark when each of said optical images are recorded to each associated optical image recording area of said plurality of optical image recording areas.

2. The marking device of claim 1, further comprising:

a feeder that supplies said color separation optical system and said electro-developing recording medium within a plane perpendicular to an optical axis of a photographing optical system of said electro-developing camera.

3. The marking device of claim 2, wherein said feeder supplies said color separation optical system and said electro-developing recording medium in synchronization with each other.

4. The marking device of claim 1, further comprising:

a light source that emits a marking light by which said positioning mark is formed.

5. The marking device of claim 4, wherein said marking mechanism comprises a mirror that reflects said marking light, said marking light being directed to said electro-developing recording medium.

6. The marking device of claim 1, wherein said color separation optical system comprises a color filter.

7. The marking device of claim 1, wherein said marking mechanism is mounted to said color separation optical system.

8. The marking device claim 1, further comprising a shutter unit to which said marking mechanism is mounted.

9. The marking device of claim 1, wherein said marking mechanism forms a positioning mark outside of each optical image recording area of said plurality of optical image recording areas of said electro-developing recording medium, each positioning mark having a substantially similar shape and form.

10. The marking device of claim 1, further comprising:

a light unit having a light source that emits light for reproducing an object image from said optical images corresponding to said color components, said marking mechanism forming said positioning mark outside of said plurality of optical image recording areas on said electro-developing recording medium using said light.

11. The marking device of claim 10, wherein said light source comprises a light-emitting diode.

12. The marking device of claim 10, wherein said lighting unit comprises:

a first reflecting mirror that directs said light to an outside of said plurality of optical image recording areas of said electro-developing recording medium when a photographing operation occurs; and a second reflecting mirror that directs said light to said plurality of optical image recording areas of said electro-developing recording medium when a reproducing operation occurs.

13. The marking device of claim 1, wherein said positioning mark is L-shaped.

14. The marking device of claim 1, further comprising:

a determining unit that determines whether said electro-developing recording medium has been previously recorded on, by sensing said positioning mark.

15. The marking device of claim 14, wherein said recording unit comprises:

a light source that emits a light beam to illuminate an optical image recording area, of said plurality of optical image recording areas of said electro-developing recording medium, so that a transmittance of said optical image recording area is changed, to form said positioning mark.

16. The marking device of claim 15, wherein said determining unit senses said transmittance of said optical image recording area.

17. The marking device of claim 14, wherein said positioning mark comprises:

a first linear portion located at a portion extending from an upper end portion of each optical image recording area of said plurality of optical image recording areas; and a second linear portion perpendicular to said first linear portion.

18. The marking device of claim 14, wherein said determining unit comprises a line sensor that reads said optical images recorded to said plurality of optical image recording areas.

19. The marking device of claim 18, wherein said positioning mark comprises a linear portion parallel to a longitudinal axis of said line sensor, said line sensor sensing an amount of light passing through said linear portion.

20. The marking device of claim 18, wherein said determining unit comprises:
an averaging processor that finds an average value of pixel data corresponding to said positioning mark read by said line sensor.

21. The marking device of claim 10, further comprising:
a determining unit that determines whether said electro-developing recording medium has been previously recorded on, by sensing said positioning mark.

22. The marking device of claim 1, further comprising:
a sensing processor that senses color temperature information with regard to said optical images of said color components; and
a color temperature superimposing unit that superimposes said color temperature information on said positioning mark when said positioning mark is formed.

23. The marking device of claim 22, wherein said color temperature information corresponds to a transmittance of said positioning mark.

24. The marking device of claim 22, wherein said marking mechanism comprises:
a light source that emits a light beam to illuminate said electro-developing recording medium to change a transmittance of said electro-developing recording medium, to form said positioning mark.

25. The marking device of claim 1, further comprising:
a sensing processor that senses color temperature information with regard to said optical images of each of said color components;
a color temperature superimposing unit that superimposes said color temperature information on said positioning mark when said positioning mark is formed;
a color temperature reading unit that reads said color temperature information from said positioning mark;
an optical sensor that reads said optical images from said plurality of optical image recording areas; and
a control processor that controls an electric charge accumulating time of said optical sensor, in accordance with said color temperature information read by said color temperature reading unit.

26. The marking device of claim 25, wherein said color temperature reading unit and said optical sensor comprise a single sensor.

27. The marking device of claim 25, wherein said color temperature information corresponds to a transmittance of said positioning mark, said optical sensor sensing said transmittance.

28. The marking device of claim 25, wherein said optical sensor comprises a line sensor.

29. The marking device of claim 28, wherein said positioning mark comprises a linear portion parallel to a longitudinal axis of said line sensor, said line sensor sensing an amount of light passing through said linear portion.

30. The marking device of claim 1, further comprising:
a sensing processor that senses color temperature information with regard to said optical images;
a color temperature superimposing unit that superimposes said color temperature information on said positioning mark when said positioning mark is formed;
a color temperature reading unit that reads said color temperature information from said positioning mark;
a light source that emits a light beam to illuminate said electro-developing recording medium;
an optical sensor that reads said optical images from said plurality of optical image recording areas illuminated by said light source; and
a control processor that controls an amount of said light beam, in accordance with said color temperature information.

31. The marking device of claim 30, wherein said color temperature reading unit comprises an optical sensor.

32. The marking device of claim 30, wherein said color temperature information corresponds to a transmittance of said positioning mark, said optical sensor sensing said transmittance.

33. The marking device of claim 30, wherein said optical sensor comprises a line sensor.

34. The marking device of claim 33, wherein said positioning mark comprises a linear portion parallel to a longitudinal axis of said line sensor, said line sensor sensing an amount of light passing through said linear portion.

35. The marking device according to claim 1, further comprising a light source that emits light for reproducing an object image from said optical images corresponding to said color components, said light further forming said positioning mark, and a system that selectively transmits said light to a first area when a reproducing operation takes place and to a second area to form said positioning mark when a photographing operation takes place.

36. A marking device of an electro-developing type video camera having a plurality of color separation optical systems that sequentially color separate an object into a plurality of color components, and a plurality of electro-developing recording media, which respectively have an optical image recording area in which an optical image corresponding to one of said color components is electrically developed, said marking device comprising:
a marking mechanism that sequentially forms positioning marks outside of said optical image recording area, said positioning mark indicating information of an angle to a predetermined point of said optical image and a distance from said predetermined point of said optical image, said positioning mark comprising a system for combining said optical images corresponding to said color components, said marking mechanism forms a said positioning mark when each of said optical images are recorded to each associated optical image recording area of said plurality of optical image recording areas.

37. The marking device of claim 36, further comprising:
a recording medium holder that aligns said electro-developing recording media.

38. The marking device of claim 37, wherein said electro-developing recording media are vertically aligned.

39. The marking device of claim 36, further comprising:
a color separation holder that aligns said color separation optical systems.

40. The marking device of claim 39, wherein said color separation optical systems are vertically aligned.

41. The marking device of claim 39, wherein said color separation holder is semicircular, so that said color separation optical systems are held and arranged circumferentially.

42. The marking device according to claim 36, further comprising a light source that emits light for reproducing an object image from said optical images, said light further forming said positioning mark, and a system that selectively transmits said light to a first area when a reproducing operation takes place and to a second area to form said positioning mark when a photographing operation takes place.

43. A marking device of an electro-developing camera having a system that sequentially separates a plurality of color components from a luminance reflected by an object and a system that records each of said plurality of color components, said marking device comprising:

a system that moves said sequential separating system and said recording system within a plane perpendicular to an optical axis of a photographing optical system;

a light emitting device; and a system that sequentially forms positioning marks outside of an optical image recording area of said recording system using said light emitted by said light emitting device, said forming system forms a said positioning mark when each of said optical images are recorded to each associated optical image recording area of said plurality of optical image recording areas.

44. The marking device according to claim 43, further comprising a light source that emits light for reproducing an object image from said optical images corresponding to said color components, said light further forming said positioning mark, and a system that selectively transmits said light to a first area when a reproducing operation takes place and to a second area to form said positioning mark when a photographing operation take place.

* * * * *